US010634507B2

(12) United States Patent
Krishnan et al.

(10) Patent No.: US 10,634,507 B2
(45) Date of Patent: Apr. 28, 2020

(54) INTERFACING EMERGENCY EVENTS WITH MAP/ROUTING SOFTWARE TO RE-ROUTE NON-EMERGENCY TRAFFIC TO CREATE PATHS FOR EMERGENCY VEHICLES

(71) Applicant: Avaya Inc., Santa Clara, CA (US)

(72) Inventors: Parameshwaran Krishnan, Basking Ridge, NJ (US); Prithviraj P. Patil, Nashville, TN (US); Navjot Singh, Somerset, NJ (US)

(73) Assignee: Avaya Inc., Santa Clara, CA (US)

( * ) Notice: Subject to any disclaimer, the term of this patent is extended or adjusted under 35 U.S.C. 154(b) by 267 days.

(21) Appl. No.: 15/082,997

(22) Filed: Mar. 28, 2016

(65) Prior Publication Data
US 2017/0276495 A1    Sep. 28, 2017

(51) Int. Cl.
| | |
|---|---|
| *G01C 21/34* | (2006.01) |
| *G01C 21/36* | (2006.01) |
| *G01S 19/42* | (2010.01) |
| *H04W 84/18* | (2009.01) |
| *G08G 1/0967* | (2006.01) |
| *G01S 19/14* | (2010.01) |
| *G08G 1/0968* | (2006.01) |
| *H04W 84/00* | (2009.01) |

(Continued)

(52) U.S. Cl.
CPC ..... *G01C 21/3415* (2013.01); *G01C 21/3667* (2013.01); *G01S 19/14* (2013.01); *G08G 1/09675* (2013.01); *G08G 1/096725* (2013.01); *G08G 1/096741* (2013.01); *G08G 1/096791* (2013.01); *G08G 1/096827* (2013.01); *G08G 1/096844* (2013.01); *H04W 84/18* (2013.01); *G01S 19/42* (2013.01); *G08G 1/096816* (2013.01); *H04W 64/00* (2013.01); *H04W 76/50* (2018.02); *H04W 84/005* (2013.01)

(58) Field of Classification Search
CPC ..... B60W 2750/40; G01S 19/42; H04L 51/20
See application file for complete search history.

(56) References Cited

U.S. PATENT DOCUMENTS

| | | | |
|---|---|---|---|
| 9,841,767 B1 * | 12/2017 | Hayward | G08G 1/166 |
| 10,008,111 B1 * | 6/2018 | Grant | G08G 1/0965 |

(Continued)

FOREIGN PATENT DOCUMENTS

| | | | | |
|---|---|---|---|---|
| DE | 19842912 | | 3/2000 | |
| DE | 102011102024 A1 * | | 4/2012 | B60W 30/09 |

(Continued)

*Primary Examiner* — Thomas G Black
*Assistant Examiner* — Ce Li Li
(74) *Attorney, Agent, or Firm* — Sheridan Ross P.C.

(57) ABSTRACT

A Public Safety Access Point (PSAP) or other system can receive an emergency event. Based on information associated with the emergency event, the PSAP can determine which emergency vehicle can respond to the event. The PSAP may then determine an origination point, a destination, and a route that will be used by the emergency vehicle. The route information may then be communicated to a map server, one or more vehicles that may be affected by the route of the emergency vehicle, and/or other systems, devices, and/or computer systems. The map server, vehicles, etc. can then reroute or change a characteristic of a vehicle's travel to adjust for the travel and route of the emergency vehicles.

19 Claims, 12 Drawing Sheets

(51) Int. Cl.
*H04W 76/50* (2018.01)
*H04W 64/00* (2009.01)

(56) References Cited

U.S. PATENT DOCUMENTS

| | | | | |
|---|---|---|---|---|
| 2003/0060965 A1* | 3/2003 | MacPhail | ............. | G08G 1/0104 701/117 |
| 2003/0060966 A1* | 3/2003 | MacPhail | ............. | G08G 1/0104 701/117 |
| 2003/0060968 A1* | 3/2003 | MacPhail | ............. | G08G 1/0104 701/117 |
| 2006/0184319 A1* | 8/2006 | Seick | ..................... | G01C 21/28 701/533 |
| 2012/0072051 A1* | 3/2012 | Koon | .................. | G05D 1/0278 701/2 |
| 2012/0136559 A1* | 5/2012 | Rothschild | ........... | G08G 1/0965 701/117 |
| 2014/0303807 A1* | 10/2014 | Addepalli | ............. | H04W 4/046 701/1 |
| 2015/0085997 A1* | 3/2015 | Biage | ..................... | H04M 3/00 379/45 |
| 2015/0371352 A1* | 12/2015 | Boss | ..................... | G06Q 50/30 705/13 |
| 2016/0093213 A1* | 3/2016 | Rider | .................. | G08G 1/0965 701/537 |
| 2016/0109250 A1* | 4/2016 | Baughman | ......... | G01C 21/3415 701/515 |
| 2017/0030725 A1* | 2/2017 | Gordon | ................ | B60W 30/00 |
| 2017/0092123 A1* | 3/2017 | Duale | ................ | G01C 21/3676 |
| 2017/0108342 A1* | 4/2017 | Foreman | ............ | G01C 21/3691 |
| 2017/0352268 A1* | 12/2017 | Colella | ................ | G08G 1/0965 |

FOREIGN PATENT DOCUMENTS

| | | |
|---|---|---|
| DE | 102011107881 | 1/2013 |
| EP | 2618320 | 7/2013 |

* cited by examiner

INTERFACING EMERGENCY EVENTS WITH MAP/ROUTING SOFTWARE TO RE-ROUTE NON-EMERGENCY TRAFFIC TO CREATE PATHS FOR EMERGENCY VEHICLES

FIELD

The disclosure relates generally to dispatching emergency vehicles and particularly to managing traffic that may interfere with the travel of emergency vehicles.

BACKGROUND

In emergency situations, it is critical that emergency vehicles, e.g., ambulances, police cars, fire engines, etc., can reach their destinations timely. Systems have been developed to manage traffic lights and other road conditions. Further, public safety access points (PSAPs), which may also be referred to as public safety answering points, may have the ability to determine a best emergency vehicle to respond to an event and determine or provide a best route for that vehicle. However, currently, one of the larger delays for emergency vehicles, other vehicles or traffic on the roadway, is not managed or controlled.

Figure 1:
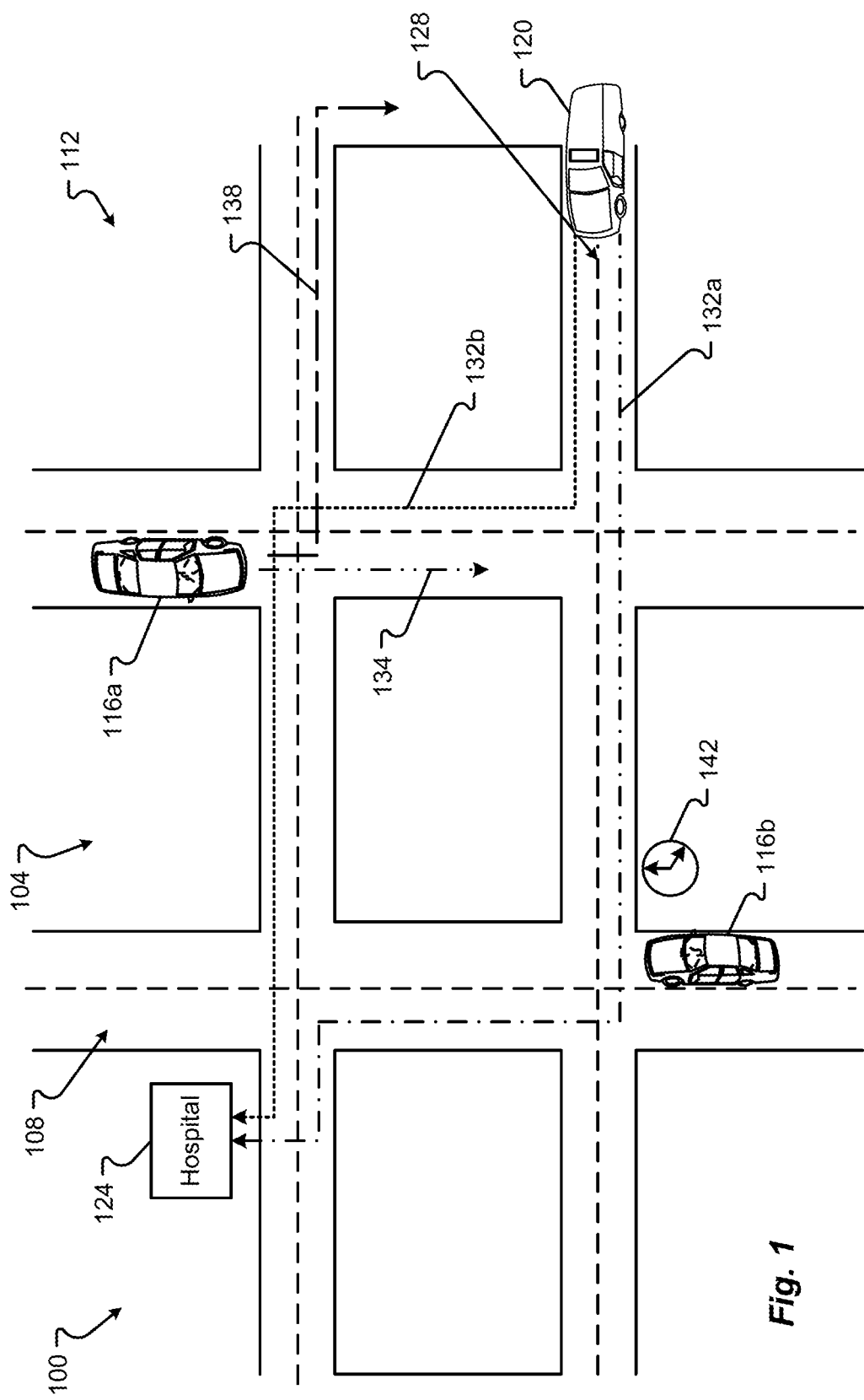
FIG. 1 is a representation of an embodiment of a cityscape or streetscape in which an emergency vehicle may travel.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Provided herein are embodiments of systems, methods, devices, data structures, user interfaces, etc. for managing traffic that may interfere with the travel of an emergency vehicles. Generally, a PSAP or other system can receive an emergency event. Based on information associated with the emergency event, the PSAP can determine which emergency vehicle can respond to the event. The PSAP may then determine an origination point, a destination, and a route that will be used by the emergency vehicle. The route information may then be communicated to a map server, one or more vehicles that may be affected by the route of the emergency vehicle, and/or other systems, devices, and/or computer systems. The map server, vehicles, etc. can then reroute or change a characteristic of a vehicle's travel to adjust for the travel and route of the emergency vehicles.

The embodiments can exploit the fact that many drivers use automated real-time maps for planning their routes. Even if the route is familiar to a user, many drivers prefer the real-time traffic-aware knowledge of automated tools to guide them. The embodiments can allow PSAPs/emergency operators to notify the automated tools of routes that they would like to "reserve" for dealing with emergencies. These routes include routes to incident sites (e.g., an accident location), routes to hospitals, or other events (e.g., high speed chases).

In some configurations, the PSAP/emergency operator may indicate the routes they would like to reserve. The drivers on the reserved routes may be notified of the reservation through a mapping service that provides programmable interfaces. In real-time or near real-time, the mapping service may route traffic around these reserved routes. This rerouting of traffic can ensure safety for the vehicles using the service and also for the emergency operators. The system may also allow subscriptions to be actively renewed or canceled for this service.

For example, assume a major accident on an interstate highway. Today, a backup of traffic will allow the mapping service to try to re-route users on another path. However, the mapping service can not anticipate if this re-routing will interfere with emergency operations (e.g., routes used by police, fire fighters, or ambulances). With the proposed system, the PSAP/emergency operator can chart out the roads that they would like to keep clear. This reservation may depend on the size of the accident and the routes for addressing the emergency (e.g., routes to hospitals). The operator may specify the level of traffic density or clearing they would like (for example, completely clear—no automobiles on the route, 50% lesser traffic, etc.). The mapping service can use this information to re-route traffic around these routes when steering vehicles away from the accident site.

Traffic Management Environment

An embodiment of a traffic management environment 100 may be as shown in FIG. 1. The environment 100 may be any area where vehicles travel and where emergency vehicles are deployed. Thus, the environment 100 can include a cityscape or streetscape, such as that shown in FIG. 1. The environment 100 shown in FIG. 1 is a two-dimensional view of streets within an area 104 used by both vehicles 116a, 116b and emergency vehicles 120. If the environment 100 is a cityscape, the environment 100 may be composed of blocks 112 that may contain houses, parking lots or other city structures that are separated by one or more roads 108.

An emergency may occur within the environment 100. In response to the emergency, the emergency vehicle 120 may be trying to travel from an origination point 128 to a destination point 124. The destination point 124 may be an accident, a hospital, a scene of an event needing police response, or some other place where emergency assistance is required. To get from the origination 128 to destination 124, the emergency vehicle 120 may follow one of many possible routes 132a, 132b. The route 132 may cross the route 134 of one or more vehicles 116. To ensure that the emergency vehicle 120 can follow the route 132 without interference from the vehicles 116, the systems and embodiments described herein may alter or change how the vehicles 116 travel through the environment 100 to avoid interfering with the emergency vehicle 120.

For example, vehicle 116a may be following route 134. Either automatically or by some alert, the vehicle 116a may be rerouted along new route 138 such that vehicle 116a may pass behind emergency vehicle 120 as the emergency vehicle 120 follows route 132a. Thus, vehicle 116a does not interfere with the travel of the emergency vehicle 120.

In another scenario, vehicle 116b may be delayed some time represented by clock 142 until emergency vehicle 120 is past vehicle 116b. Thus, the routes of travel, behavior of the vehicles 116, etc. can be altered to allow for the emergency vehicle 120 to reach its destination in the shortest amount of time with the least amount of interference.

Traffic Management System

Figure 2:
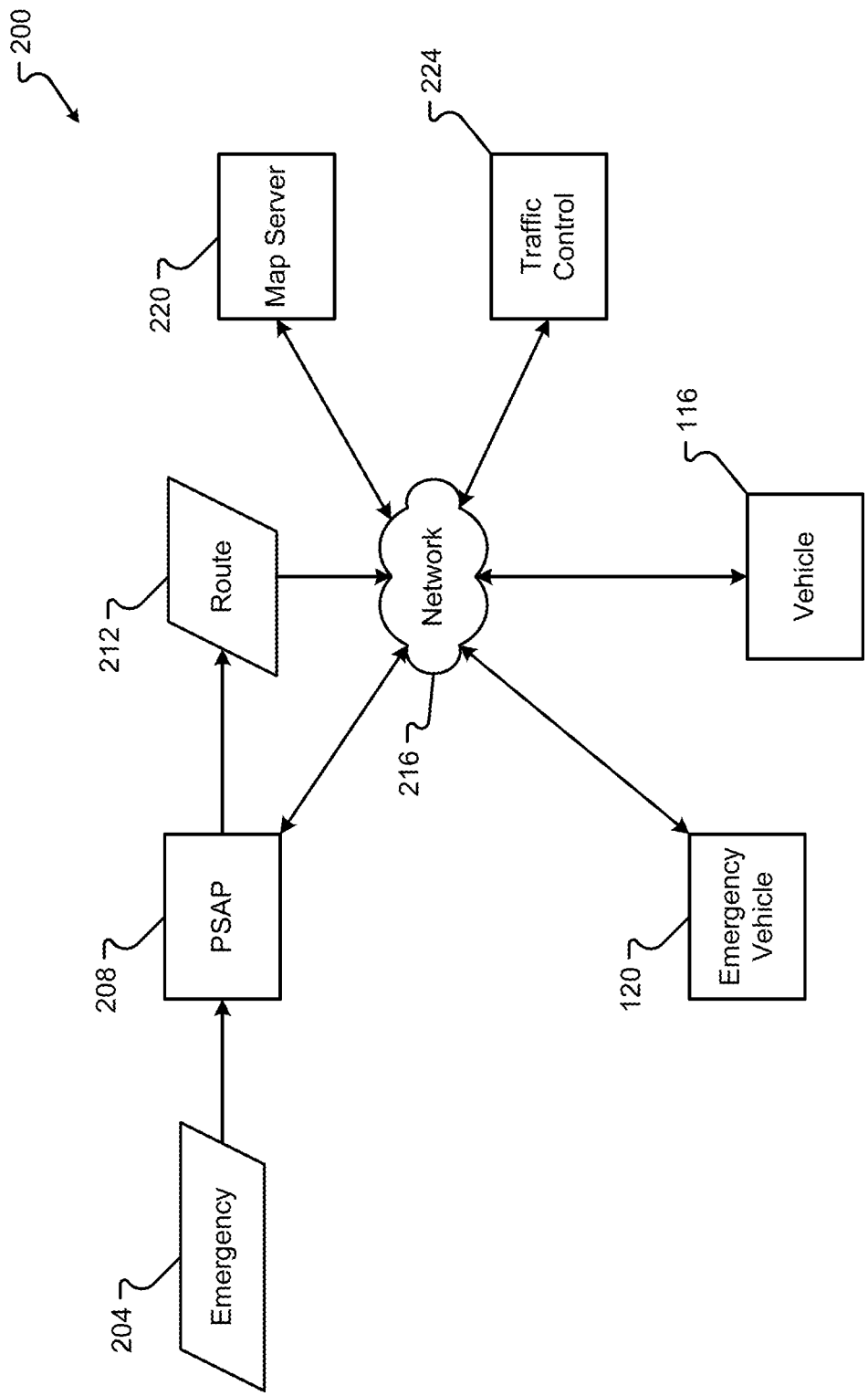
FIG. 2 is a block diagram of an embodiment of a system for managing traffic that may interfere with the travel of an emergency vehicle.

An embodiment of a system 200 for managing the rerouting of vehicles 116 in the environment 100 may be as shown in FIG. 2. The system can include the vehicle 116 and the emergency vehicle 120. The vehicle 116 and emergency vehicle 120 can include computing systems, as described in conjunction with FIGS. 11 and 12, that may be connected through a network 216 to one or more other hardware systems, which may include one or more servers as described in conjunction with FIGS. 11 and 12. The network may be any type of communication network for example, the Internet, wide area networks, local area networks, etc. that may use any type of technology or protocol to communicate messages between one or more computer systems.

A public safety answering point (PSAP) 208 may be a computer and communication system that can receive emergency events 204 and provide or select routes 212 for the emergency vehicles 120. The PSAP 208 can include a call center and any necessary server or computer system, such as those described in conjunction with FIGS. 11 and 12, that can receive an emergency 204 through a phone call or other type of communication. The emergency event 204 can be any type of event that requires an emergency vehicle 120 to respond to a destination or location 124. For example, the event 204 may include a request for the fire department, a request for police assistance, a request for ambulance, a request, from an emergency vehicle 120 to clear a route to a hospital or other emergency facility 124, etc.

Some or all the information associated with the event 204, with other metadata that may be deduced or determined by the PSAP 208, may be presented, recorded, and/or developed by the PSAP 208 and displayed for any personnel interacting with the PSAP 208. The metadata can include the current location of the emergency vehicle 120 and the destination required 124, a current time or date, traffic patterns or current levels of congestion, etc.

From the event and metadata information, the PSAP 208 can determine possible routes, for example, route 132, for the emergency vehicle 120. There may be two or more routes available to the emergency vehicle 120, in which case the PSAP 208 or a PSAP agent or other person, in communication with the PSAP 208, can select the preferred route 132. The route 212 and metadata describing such route may then be communicated to the emergency vehicle 120, to a vehicle 116 through a network 216, to a map server 220, or to a traffic control system 224.

The map server 220 can be a server or other computer system (as described in conjunction with FIGS. 11 and 12) that is capable of sending alerts, for example, traffic congestion, emergency, or accident alerts, to a vehicle 116. Sophisticated mapping programs, contained in vehicles 116, may include a connection to a map server 220 to update real time mapping or geographical system information for the map in the vehicle 116. Updates may include information about current conditions on the roadways presented in a map on the user interface of the vehicle 116. Thus, the route 212 may be sent to the map server 220 to allow for changes to the map in the vehicle 116 and/or information that may be associated with the route 212 may be sent from the map server 220 to the vehicle 116. The map server 220 can receive the route information 212 and may determine one or more vehicles 116 that need to receive the new information. This route information 212 may then be broadcast to all vehicles or to only a subset of the vehicles 116 which may be affected by the route 212. In some circumstances or configurations, the map server 220 can change the routes of vehicles 116 and send updated routes to the vehicles 116 rather than have the vehicle 116 change the routes.

The traffic control system 224 can be a computer system or server (as described in conjunction with FIGS. 11 and 12) that changes the traffic lights or other systems in the environment 100. The traffic control system 224 can provide the best or quickest way through red lights and other infrastructure along route 132 by changing lights or manipulating the characteristics of the environment 100. This traffic control system 224 may also receive information/instructions from the PSAP 208 and/or provide information/instructions to the map server 220 and/or the vehicles 116 to change their routes.

Vehicle Control System

Figure 3:
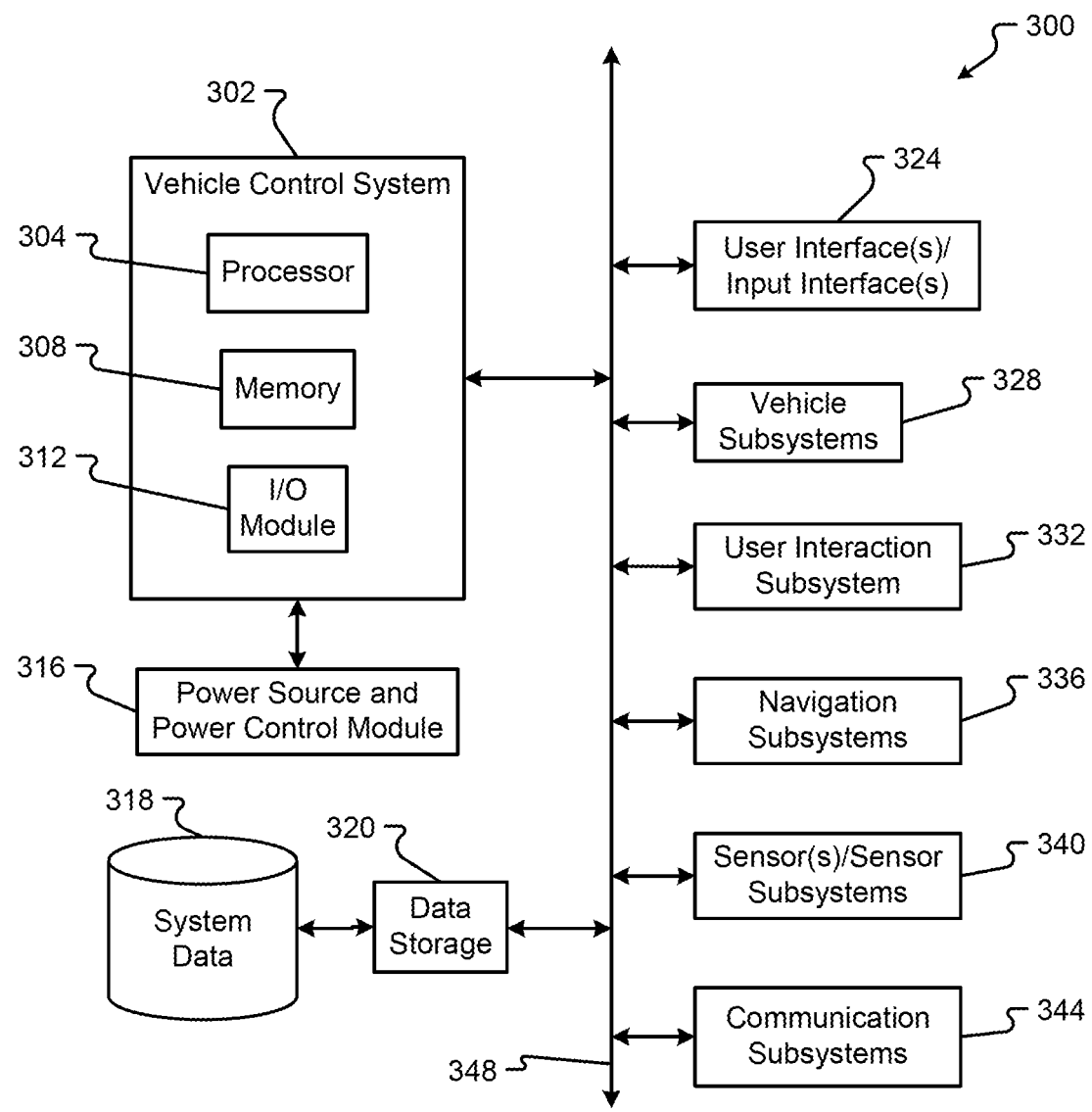
FIG. 3 is a block diagram of an embodiment of a hardware/software system of a vehicle that may interfere with the travel of an emergency vehicle.

An embodiment of a vehicle control environment 300 including a vehicle control system 302 that can be part of the vehicle 116 may be as shown in FIG. 3. Beyond the vehicle control system 302, the vehicle control environment 300 can include one or more of, but is not limited to, a power source and/or power control module 316, a data storage module 320, user interface(s)/input interface(s) 324, vehicle subsystems 328, user interaction subsystems 332, Global Positioning System (GPS)/Navigation subsystems 336, sensor(s) and/or sensor subsystems 340, and/or communication subsystems 344. The subsystems, modules, components, etc. 316-344 may include hardware, software, firmware, computer readable media, displays, input devices, output devices, etc. or combinations thereof. The system, subsystems, modules, components, etc. 302-344 may communicate over a network or bus 348. This communication bus 348 may be bidirectional and perform data communications using any known or future-developed standard or protocol.

The vehicle control system 302 can include a processor 304, memory 308, and/or an input/output (I/O) module 312. Thus, the vehicle control system 302 may be a computer system such as those described in conjunction with FIGS. 11 and 12, which can comprise hardware elements that may be electrically coupled. The hardware elements may include one or more central processing units (CPUs) 304; one or more components of the I/O module 312 including input devices (e.g., a mouse, a keyboard, etc.) and/or one or more output devices (e.g., a display device, a printer, etc.).

The processor 304 may comprise a general purpose programmable processor or controller for executing application programming or instructions. The processor 304 may, optionally, include multiple processor cores, and/or implement multiple virtual processors. Additionally or alternatively, the processor 304 may include multiple physical processors. As a particular example, the processor 304 may comprise a specially configured application specific integrated circuit (ASIC) or other integrated circuit, a digital signal processor, a controller, a hardwired electronic or logic circuit, a programmable logic device or gate array, a special purpose computer, or the like. The processor 304 generally functions to run programming code or instructions implementing various functions of the vehicle control system 302.

The input/output module 312 and associated ports may be included to support communications over wired or wireless networks or links, for example with other communication devices, server devices, and/or peripheral devices either internal or external to the vehicle 116. Examples of an input/output module 312 include an Ethernet port, a Universal Serial Bus (USB) port, Institute of Electrical and Electronics Engineers (IEEE) 1594, or other interface.

The vehicle control system 302 may also include one or more storage devices and/or memory 308. By way of example, storage devices 308 may be disk drives, optical storage devices, solid-state storage devices such as a random access memory ("RAM") and/or a read-only memory ("ROM"), which can be programmable, flash-updateable and/or the like. The vehicle control system 302 may additionally include a computer-readable storage media reader; a communications system (e.g., a modem, a network card (wireless or wired), an infra-red communication device, etc.); and working memory 308, which may include RAM and ROM devices as described above. The vehicle control system 302 may also include a processing acceleration unit, which can include a digital signal processor (DSP), a special-purpose processor, and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The communications system may permit data to be exchanged with an external or internal network and/or any other computer or device described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices, and/or other machine readable mediums for storing information.

Figure 11:
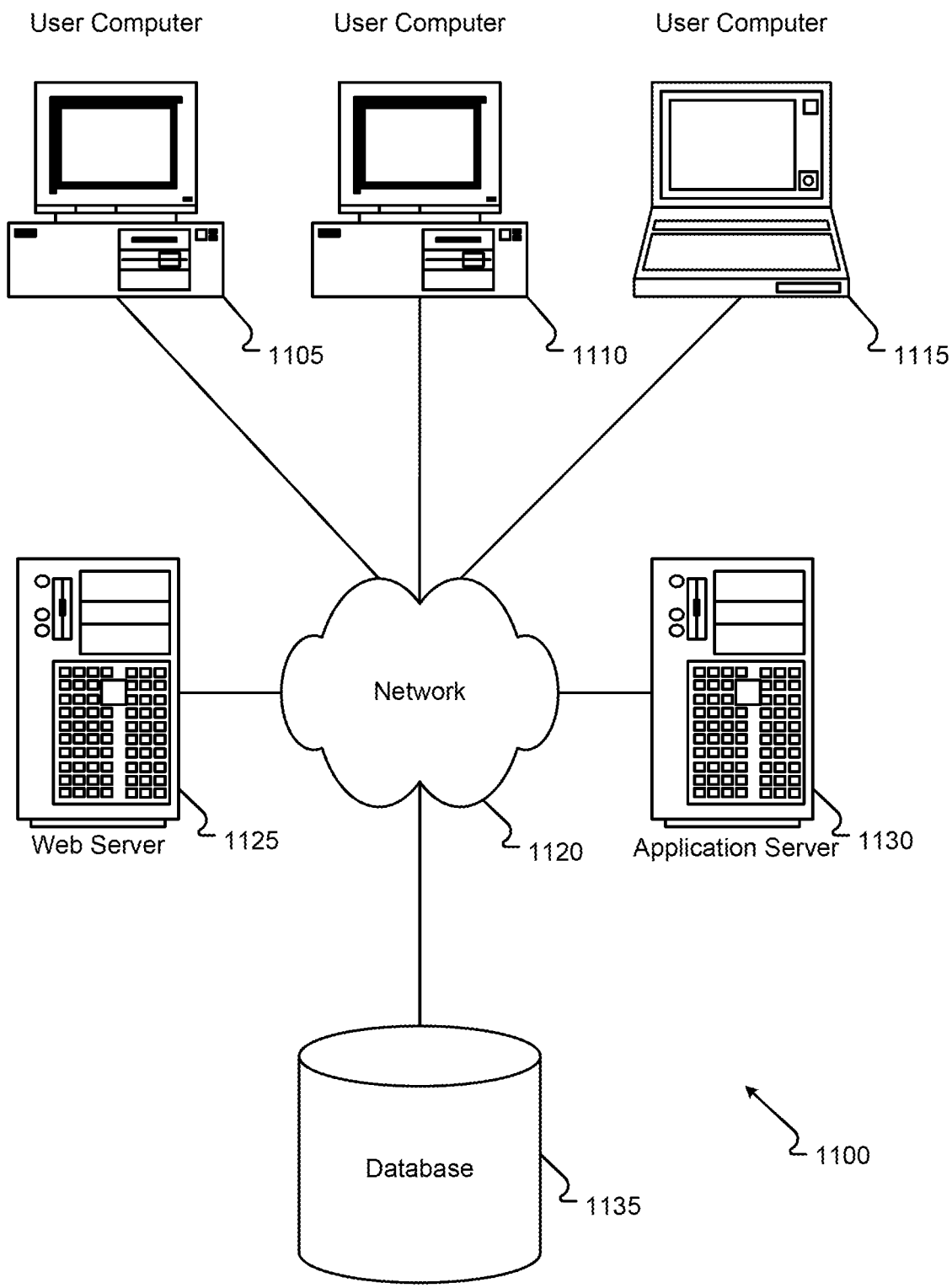
FIG. 11 is a block diagram of an embodiment of a computing environment.
Figure 12:
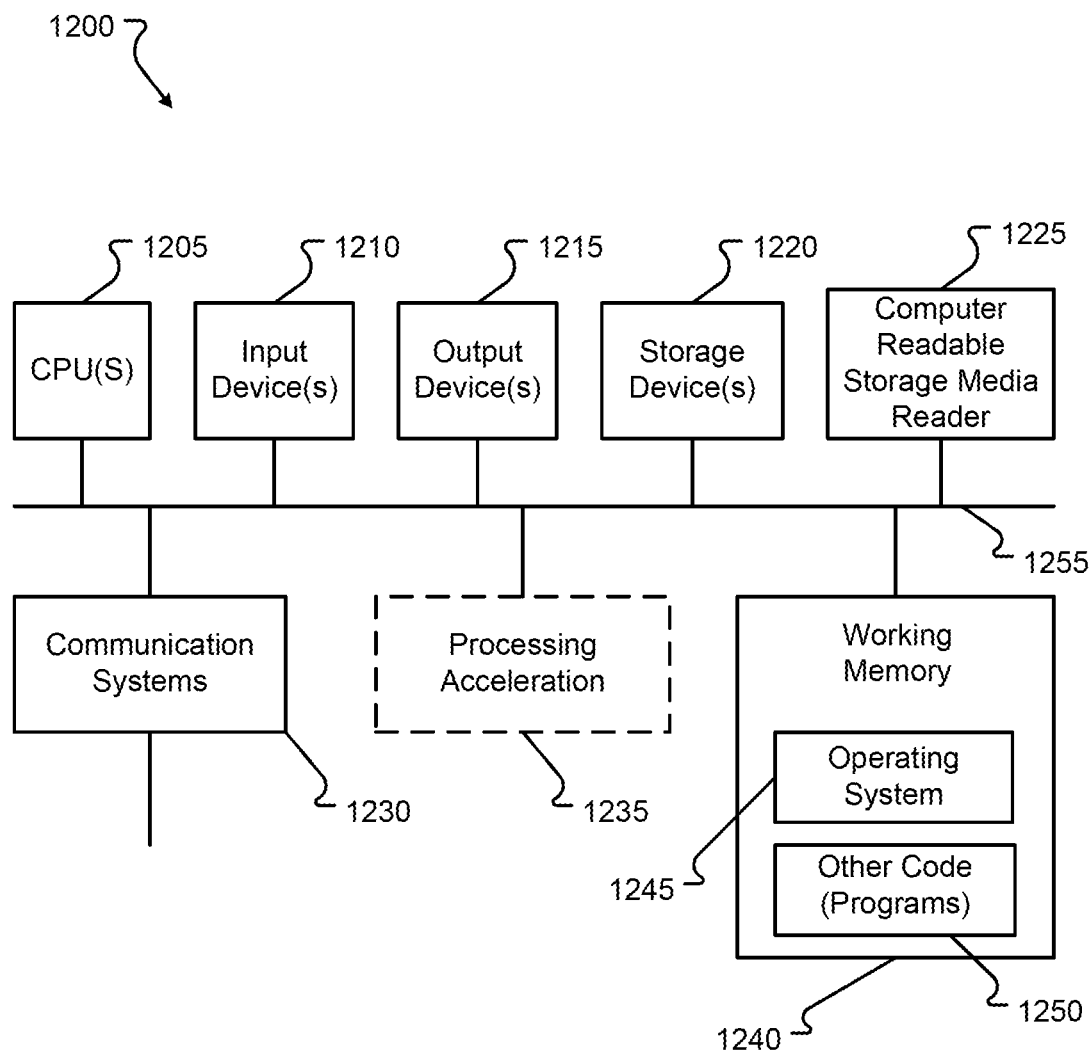
FIG. 12 is a block diagram of an embodiment of a computer system.

The vehicle control system 302 may also comprise software elements including an operating system and/or other code, as described in conjunction with FIGS. 11 and 12. It should be appreciated that alternates to the vehicle control system 302 may have numerous variations from that described herein. For example, customized hardware might also be used and/or particular elements might be implemented in hardware, software (including portable software, such as applets), or both. Further, connection to other computing devices such as network input/output devices may be employed.

The power source and/or power control module 316 can include any type of power source, including, but not limited to, batteries, alternating current sources (from connections to a building power system or power line), solar cell arrays, etc. One or more components or modules may also be included to control the power source or change the characteristics of the provided power signal. Such modules can include one or more of, but is not limited to, power regulators, power filters, alternating current (AC) to direct current (DC) converters, DC to AC converters, receptacles, wiring, other converters, etc. The power source and/or power control module 316 functions to provide the vehicle control system 302 and any other system with power.

The data storage 320 can include any module for storing, retrieving, and/or managing data in one or more data stores and/or databases. The database or data stores may reside on a storage medium local to (and/or resident in) the vehicle control system 302 or in the vehicle 116. Alternatively, some of the data storage capability may be remote from the vehicle control system 302 or automobile, and in communication (e.g., via a network) to the vehicle control system 302. The database or data stores may reside in a storage-area network ("SAN") familiar to those skilled in the art. Similarly, any necessary files for performing the functions attributed to the vehicle control system 302 may be stored locally on the respective vehicle control system 302 and/or remotely, as appropriate. The databases or data stores may be a relational database, and the data storage module 320 may be adapted to store, update, and retrieve data in response to specifically-formatted commands. The data storage module 320 may also perform data management functions for any flat file, object oriented, or other type of database or data store.

A first data store that may be part of the vehicle control environment 300 is a system data store 318 for storing data about maps and navigation. The system data store 318 can also include data used by the vehicle control system 302 and/or one or more of the components 324-344 to facilitate the functionality described herein. The data store 318 may be as described in conjunction with FIGS. 6A and/or 6B.

The user interface/input interfaces 324 may be as described herein for providing information or data and/or for receiving input or data from a user. Vehicle systems 328 can include any of the mechanical, electrical, electromechanical, computer, or other systems associated with the function of the vehicle 116. For example, vehicle systems 328 can include one or more of, but is not limited to, the steering system, the braking system, the engine and engine control systems, the electrical system, the suspension, the drive train, the cruise control system, the radio, the heating, ventilation, air conditioning (HVAC) system, the windows and/or doors, etc. These systems are well known in the art and will not be described further.

A user interaction subsystem 332 may comprise hardware and/or software that conduct various operations for or with the vehicle 116. For instance, the user interaction subsystem 332 may conduct operations which may include, but are not limited to, providing information to the user, receiving input from the user, and controlling the functions or operation of the vehicle 116, etc. Among other things, the user/device interaction subsystem 332 may include a computing system operable to conduct the operations as described herein.

The user interaction subsystem 332 can include one or more of the components and modules provided herein. For instance, the user interaction subsystem 332 can include one or more of a video input/output interface, an audio input/output interface, a sensor interface, a user identifier, a vehicle controller, an environmental controller, and a gesture control interface. The user interaction subsystem 332 may be in communication with other devices, modules, and components of the system 302 via the communications channel 348.

The user interaction subsystem 332 may be configured to receive input from a user and/or device via one or more components of the system. By way of example, a user may provide input to the user interaction subsystem 332 via video input (e.g., via at least one image sensor/camera, etc.), audio input (e.g., via the microphone, audio input source, etc.), gestures (e.g., via at least one image sensor, motion sensor, etc.), device input (e.g., via a device associated with the user, etc.), combinations thereof, and the like.

A sensor interface may be configured to receive and/or interpret input provided by one or more sensors 340 in the vehicle 116. In some cases, the sensors 340 may be associated with one or more user devices. Optionally, the sensors 340 may be associated with the vehicle 116. Various sensors 340 that may be associated with a vehicle 116 can include interior and exterior sensors, although it should be appreciated that any of the one or more of the sensors 340 may be used in both the interior space and the exterior space of the vehicle 116. The sensors 340 may communicate with each other, with devices, and/or the vehicle control system 302 via one or more communications channel(s) 348.

Interior sensors 340 may be arranged into one or more groups, based at least partially on the function of the interior sensors 340. The interior space of a vehicle 116 may include an environmental group, a user interface group, and a safety group. Additionally or alternatively, there may be sensors 340 associated with various devices inside the vehicle (e.g., smart phones, tablets, mobile computers, etc.). The environmental group may comprise sensors 340 configured to collect data relating to the internal environment of a vehicle 116. Examples of environmental sensors 340 associated with the environmental group may include, but are not limited to, oxygen/air sensors 340, temperature sensors 340, humidity sensors 340, light/photo sensors 340, and more. The user interface group may comprise sensors 340 configured to collect data relating to one or more users in a vehicle 116. Examples of user interface sensors 340 associated with the user interface group may include, but are not limited to, infrared sensors 340, motion sensors 340, weight sensors 340, wireless network sensors 340, biometric sensors 340, camera (or image) sensors 340, audio sensors 340, and more. The safety group may comprise sensors 340 configured to collect data relating to the safety of a user and/or one or more components of a vehicle 116. Examples of safety sensors 340 associated with the safety group may include, but are not limited to, force sensors 340, mechanical motion sensors 340, orientation sensors 340, restraint sensors 340, and more.

Exterior sensors 340 for a vehicle 116 may include sensors 340 that are identical, or substantially similar, to those previously disclosed in conjunction with the interior sensors 340. Optionally, the exterior sensors 340 may be configured to collect data relating to one or more conditions, objects, users, and other events that are external to the interior space of the vehicle 116. For instance, the oxygen/air sensors 340 may measure a quality and/or composition of the air outside of a vehicle 116. As another example, the motion sensors 340 may detect motion outside of a vehicle 116.

The user identifier may be configured to identify a user associated with the vehicle 116. The identification may be based on user profile information that is stored in system data 318. For instance, the user identifier may receive characteristic information about a user via a device, a camera, and/or some other input. The received characteristics may be compared to data stored in the system data 318. Where the characteristics match, the user is identified. As can be appreciated, where the characteristics do not match a user profile, the user identifier may communicate with other subsystems in the vehicle 116 to obtain and/or record profile information about the user. This profile information may be stored in a memory and/or the system data 318.

The vehicle controller may be configured to control settings, features, and/or the functionality of a vehicle 116. In some cases, the vehicle controller can communicate with the vehicle control system 302 to control critical functions (e.g., driving system controls, braking, accelerating, etc.) and/or noncritical functions (e.g., driving signals, indicator/hazard lights, mirror controls, window actuation, etc.) based at least partially on user/device input received by the user interaction subsystem 332.

The environmental controller may be configured to control settings, features, and/or other conditions associated with the environment, especially the interior environment, of a vehicle 116. Optionally, the environmental controller may communicate with the climate control system (e.g. changing cabin temperatures, fan speeds, air direction, etc.), oxygen and/or air quality control system (e.g., increase/decrease oxygen in the environment, etc.), interior lighting (e.g., changing intensity of lighting, color of lighting, etc.), an occupant seating system (e.g., adjusting seat position, firmness, height, etc.), steering wheel (e.g., position adjustment, etc.), infotainment/entertainment system (e.g., adjust volume levels, display intensity adjustment, change content, etc.), and/or other systems associated with the vehicle environment. As can be appreciated, the environmental controller may control the environment based at least partially on user/device input received by the user interaction subsystem 332.

The gesture control interface is configured to interpret gestures provided by a user in the vehicle 116. Optionally, the gesture control module may provide control signals to one or more of the vehicle systems disclosed herein. For example, a user may provide gestures to control the environment, critical and/or noncritical vehicle functions, the infotainment system, communications, networking, and more. Optionally, gestures may be provided by a user and detected via one or more of the sensors. As another example, one or more motion sensors may receive gesture input from a user and provide the gesture input to the gesture control interface. Continuing this example, the gesture input is interpreted by the gesture control interface. This interpretation may include comparing the gesture input to gestures stored in a memory. The gestures stored in memory may include one or more functions and/or controls mapped to specific gestures. When a match is determined between the detected gesture input and the stored gesture information, the gesture control interface can provide a control signal to any of the systems/subsystems as disclosed herein.

Figure 5:
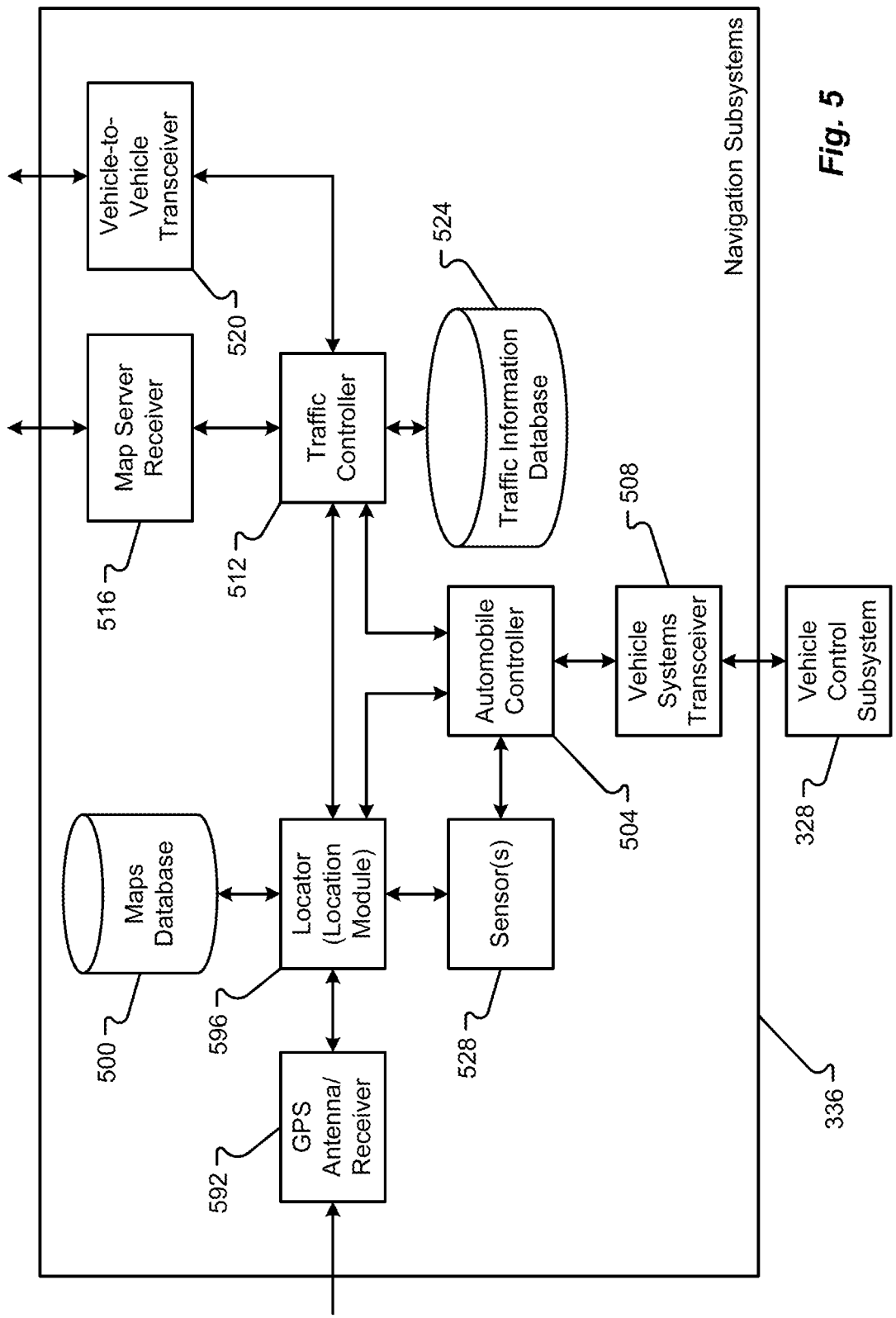
FIG. 5 is a block diagram of an embodiment of the hardware/software of a navigation system of a vehicle that may interfere with the travel of an emergency vehicle.

The navigation subsystem(s) 336 can be any present or future-built navigation system that may use location data, for example, from the Global Positioning System (GPS), to provide navigation information or control the vehicle 116. An example of a navigation subsystem 336 may be as shown in FIG. 5. The navigation subsystem(s) 336 can include several components or modules, such as, one or more of, but not limited to, a GPS Antenna/receiver 592, a location module 596, a maps database 500, an automobile controller 504, a vehicle systems transceiver 508, a traffic controller 512, a map server receiver 516, a vehicle-to-vehicle transceiver 520, a traffic information database 524, etc. Generally, the several components or modules 500-596 may be hardware, software, firmware, computer readable media, or combinations thereof.

A GPS Antenna/receiver 592 can be any antenna, GPS puck, and/or receiver capable of receiving signals from a GPS satellite or other navigation system, as mentioned hereinbefore. The signals may be demodulated, converted, interpreted, etc. by the GPS Antenna/receiver 592 and provided to the location module 596. Thus, the GPS Antenna/receiver 592 may convert the time signals from the GPS system and provide a location (e.g., coordinates on a map) to the location module 596. Alternatively, the location module 596 can interpret the time signals into coordinates or other location information.

The location module 596 can be the controller of the satellite navigation system designed for use in automobiles. The location module 596 can acquire position data, as from the GPS Antenna/receiver 592, to locate the user or vehicle 116 on a road in the unit's map database 500. Using the road database 500 or information from the traffic controller 512, the location module 596 can give directions to other locations along roads also in the database 500 and/or may locate other vehicles, such as the emergency vehicle 120. When a GPS signal is not available, the location module 596 may apply dead reckoning to estimate distance data from sensors including one or more of, but not limited to, a speed sensor attached to the drive train of the vehicle 116, a gyroscope, an accelerometer, etc. GPS signal loss and/or multipath can occur due to urban canyons, tunnels, and other obstructions. Additionally or alternatively, the location module 596 may use known locations of Wi-Fi hotspots, cell tower data, etc. to determine the position of the vehicle 116, such as by using time difference of arrival (TDOA) and/or frequency difference of arrival (FDOA) techniques.

The maps database 500 can include any hardware and/or software to store information about maps, geographical information system information, location information, etc. The maps database 500 can include any data definition or other structure to store the information. Generally, the maps database 500 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. In some situations, the waypoint represents a second destination location, between the destination location and origination location, where the emergency vehicle must stop before reaching the destination location. For example, a point of interest may include speed cameras, fuel stations, public parking, and "parked here" (or "you parked here") information. The map database contents can be produced or updated by a server connected through a wireless system in communication with the Internet, even as the vehicle 116 is driven along existing streets, yielding an up-to-date map.

An automobile controller 504 can be any hardware and/or software that can receive instructions from the location module 596 or the traffic controller 512 and operate the vehicle 116. The automobile controller 504 receives this information and data from the sensors 340 to operate the vehicle 116 without driver input. Thus, the automobile controller 504 can drive the vehicle 116 along a route provided by the location module 596. The route may be adjusted by information sent from the traffic controller 512. Discrete and real-time driving can occur with data from the sensors 340. To operate the vehicle 116, the automobile controller 504 can communicate with a vehicle systems transceiver 508.

The vehicle systems transceiver 508 can be any present or future-developed device that can comprise a transmitter and/or a receiver, which may be combined and can share common circuitry or a single housing. The vehicle systems transceiver 508 may communicate or instruct one or more of the vehicle control subsystems 328. For example, the vehicle systems transceiver 508 may send steering commands, as received from the automobile controller 504, to an electronic steering system, to adjust the steering of the vehicle 116 in real time. The automobile controller 504 can determine the effect of the commands based on received sensor data 328 and can adjust the commands as need be. The vehicle systems transceiver 508 can also communicate with the braking system, the engine and drive train to speed or slow the car, the signals (e.g., turn signals and brake lights), the headlights, the windshield wipers, etc. Any of these communications may occur over the components or function as described herein.

A traffic controller 512 can be any hardware and/or software that can communicate with an automated traffic system/traffic control 224 and/or a map server 516 and adjust the function of the vehicle 116 based on instructions or alerts provided. A traffic control server 224 and/or map server 220 are systems that manage the traffic in a given area. This traffic control server 224 and/or map server 220 can instruct cars to drive in certain lanes, instruct cars to raise or lower their speed, instruct a car to change their route of travel, instruct cars to communicate with other cars, etc. To perform these functions, the traffic controller 512 may register the vehicle 116 with the traffic control server 224 and/or map server 220 and then provide other information including the route of travel. The traffic control server 224 and/or map server 220 can return registration information and any required instructions. The communications between the traffic control server 224 and/or map server 220 and the traffic controller 512 may be received and sent through a map server receiver 516.

The map server receiver 516 can be any present or future-developed device that can comprise a transmitter and/or a receiver, which may be combined and can share common circuitry or a single housing. The map server receiver 516 may communicate with the traffic control server 224 and/or map server 220 using any known or future-developed, protocol, standard, frequency, bandwidth range, etc. The map server receiver 516 enables the sending of information between the traffic controller 512 and the traffic control server 224 and/or map server 220.

The traffic controller 512 can also communicate with another vehicle, e.g., an emergency vehicle 120, which may be in physical proximity (i.e., within range of a wireless signal), using the vehicle-to-vehicle transceiver 520. As with the map server receiver 516, the vehicle-to-vehicle transceiver 520 can be any present or future-developed device that can comprise a transmitter and/or a receiver, which may be combined and can share common circuitry or a single housing. Generally, the vehicle-to-vehicle transceiver 520 enables communication between the vehicle 116 and any other vehicle, through the other vehicle's vehicle-to-vehicle transceiver 520, which may relay communications to the other vehicle's traffic controller 512. These communications allow the vehicle 116 to receive traffic or safety information, control or be controlled by another vehicle, establish an alternative communication path to communicate with the traffic control server 224 and/or map server 220, establish a node including two or more vehicle that can function as a unit, etc. The vehicle-to-vehicle transceiver 520 may communicate with the other vehicles using any known or future-developed, protocol standard, frequency, bandwidth range, etc.

The traffic controller 512 can control functions of the automobile controller 504 and communicate with the location module 596. The location module 596 can provide current location information and route information that the traffic controller 512 may then provide to the traffic control server 224 and/or map server 220. The traffic controller 512 may receive route adjustments from the traffic control server 224 and/or map server 220 that are then sent to the location module 596 to change the route. Further, the traffic controller 512 can also send driving instructions to the automobile controller 504 to change the driving characteristics of the vehicle 116. For example, the traffic controller 512 can instruct the automobile controller 504 to accelerate or decelerate to a different speed, change lanes, or perform another driving maneuver. The traffic controller 512 can also manage vehicle-to-vehicle communications and store information about the communications or other information in the traffic information database 524.

The traffic information database 524 can be any type of database, such as relational, hierarchical, object-oriented, and/or the like. The traffic information database 524 may reside on a storage medium local to (and/or resident in) the vehicle control system 204 or in the vehicle 116. The traffic information database 524 may be adapted to store, update, and retrieve information about communications with other vehicles or any active instructions from the traffic control server 224 and/or map server 220. This information may be used by the traffic controller 512 to instruct or adjust the performance of driving maneuvers.

The communication subsystem 344 can include any hardware and/or software to conduct communications between the vehicle 116/120 and any other system or device in the environment 100. In some configurations, the communication subsystem 344 can include an interface in communication with an operating system. The interface may translate or interpret operating system instructions into messages for communication to or from other systems in any protocol or standard. The communications may pass through a firewall. The firewall can be any software that can control the incoming and outgoing communications by analyzing the data packets and determining whether the packets should be allowed through the firewall, based on applied rule set. A firewall can establish a "barrier" between a trusted, secure internal network and another network (e.g., the Internet) that is not assumed to be secure and trusted.

The operating system can be a collection of software that manages computer hardware resources and provides common services for applications and other programs. The operating system may schedule time-sharing for efficient use of the system. For hardware functions, such as input, output, and memory allocation, the operating system can act as an intermediary between applications or programs and the computer hardware. Examples of operating systems that may be deployed as, operating system include Android, BSD, iOS, Linux, OS X, QNX, Microsoft Windows, Windows Phone, IBM z/OS, etc.

An IP module within the communications subsystems 344 can conduct any IP addressing, which may include the assignment of IP addresses and associated parameters to host interfaces. The address space may include networks and sub-networks. The IP module can perform the designation of network or routing prefixes and may conduct IP routing, which transports packets across network boundaries. Thus, the IP module may perform all functions required for IP multicast operations.

The communications subsystems 344 may conduct all functions for communicating over other systems or using various protocols. Thus, the communications subsystems 344 can manage multicast operations over busses or networks. Further, the communications subsystems 344 may perform or manage communications to one or more devices, systems, data stores, services, etc. that are in communication with the vehicle control system 302 or other subsystems through the firewall.

Figure 4:
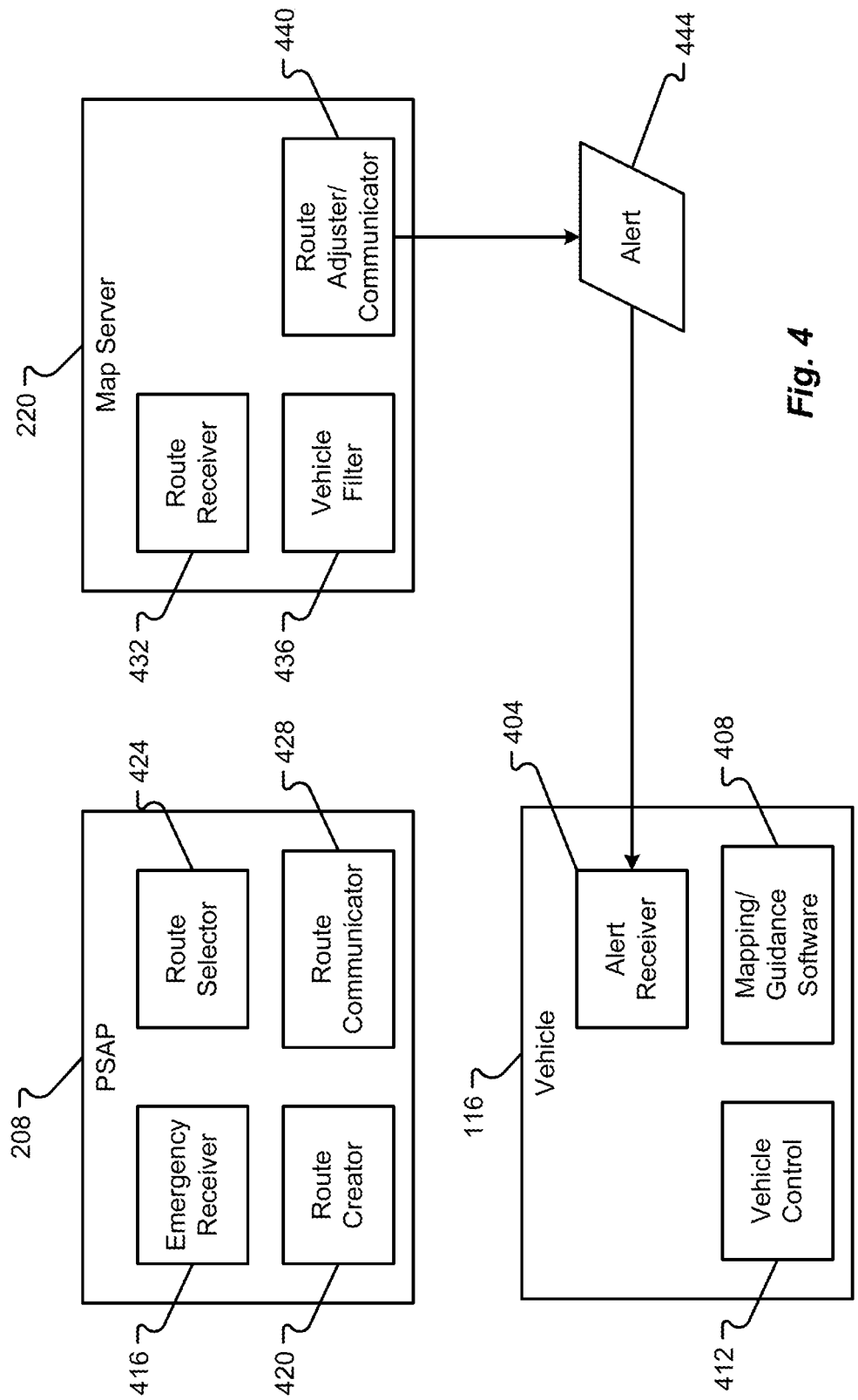
FIG. 4 is a block diagram of an embodiment of hardware/software systems for a PSAP, vehicle, and/or map server that manage a vehicle that may interfere with the travel of an emergency vehicle.

An additional or alternative configuration of hardware and/or software contained within the PSAP 208, the traffic map system 220, and/or the vehicle 116 (may also be part of emergency vehicle 120) may be as shown in FIG. 4. The PSAP 208 may include an emergency receiver 416, a route creator 420, a route selector 424 and a route communicator 428. The emergency receiver 416 can receive the emergency event 204 and generate a corresponding event within the PSAP 208 originated from a phone call or other communication received by the PSAP 208. The emergency receiver 416 can thus interface with any communication systems attached or connected to the PSAP either wirelessly or wired. The emergency event created by the emergency receiver 416 may then be sent to the route creator 420.

The route creator 420 may take information contained within the emergency event 204, such as the destination 124 or origination 128, to generate a route for an emergency vehicle 120. The event information may be analyzed using a geographical information system and map data to create a route 132. In some circumstances, the route creator 420 can create two or more routes. The route information 132 may then be sent to the route selector 424.

The route selector 424 can receive input from a user of the PSAP system 208 to select the best route of two or more routes created by the route creator 420. If there is only one route provided, that route may be automatically selected by the route selector 424. Any input received from the user for route selection 212 may then be sent back to the route creator 420. The route creator 420 may then communicate information about the route 132 to the route communicator 428. The route communicator 428 may then send the route 212, out through a network 216, to one or more vehicles 116, the emergency vehicle 120, the map server 220, and/or the traffic control system 224. The communicated route 212 can have any data or metadata required to reroute vehicles 116 in the environment 100.

The vehicle 116 can include an alert receiver 404, a mapping and guidance software 408, and/or a vehicle control 412. The emergency/alert receiver 404 can receive the emergency route information 212 from either the PSAP 208 or the map server 220. This information 212 may include the route information as described previously and provide the vehicle 116 with enough data to determine how to reroute the vehicle 116. This route information 212, interpreted by the alert receiver 404, may be passed to the mapping guidance software 408 and/or the vehicle control 412.

The mapping guidance software 408 can adjust the route of the vehicle 116, as explained in conjunction with vehicle 116a in FIG. 1. The mapping guidance software 408 may also change the time at which the car proceeds along a route, as described in conjunction with vehicle 116b in FIG. 1. Thus, the mapping guidance software 408 adjusts the route of the vehicle provided on a map user interface or as used by a vehicle controlled automatically to control the vehicle along the route. The changes to the route provided on the map use interface may be executed by the driver of the vehicle.

The vehicle control 412 can respond to the mapping and guidance software 408 and/or the alert sent from the alert receiver 404 to change the function of the car automatically. Thus, the vehicle control 412 can interface with the traffic controller 512, automobile controller 504, or other systems to enable the vehicle to be self-driving and to automatically change the behavior of the vehicle 116 to conform to requirements as specified by the alert receiver 404 and/or mapping/guidance software 408. This behavior can include pulling over to the side of the road, changing the routes, stopping, or some other function of the vehicle 116 which may be performed automatically by the vehicle controller 412.

Traffic mapping server 220 may include a route receiver 432, a vehicle filter 436, a route adjustment communication 440, which can generate an alert 444. The route receiver 432 may receive the route information 212 from the PSAP 208, as described previously. The route information 212 can include any data or metadata required by the route receiver 432 of the map server 220 to change the routes of one or more vehicles 116. This information 212 may be sent then to the vehicle filter 436.

The vehicle filter 436 can determine which vehicle 116 may be affected by the route 212. Thus, the server 220 may receive information from the vehicles 116 to determine which vehicles are within a certain geographical area. In other configurations, the vehicle filter 436 may determine which vehicles are within a certain geographical area based on other metadata or data within the map server 220, e.g., previous registration information of vehicles with the map server 220. If the vehicles are determined to be within a particular area, the vehicle filter 436 can determine which vehicle, such as vehicles 116a and 116b are within or may be affected by the route 132. This determination may include determining a physical proximity, a temporal proximity, or likewise to the route 132 in the current area 104. Thus, the vehicle filter 436 may request route information from vehicles 116 or retrieve such information from data stored at the map server and compare that information to the route 132. Possible correlations may then be identified. This identified vehicles that may be affected may then be passed or sent to the route adjustment communicator 440.

The route adjustment communicator can then compile the alert 444 or any other information required for the vehicles 116. The alert information may then be broadcast out, as an alert 444, with information within the alert that identifies the affect vehicles 116 or may be sent to each identified vehicle 116. The alert can be received by the alert receiver 404 of each vehicle. The route adjustment communicator 440 can include any information about the route 132 required by the vehicles 116 automatically to adjust the vehicles' routes. In other configurations, the route adjustment communicator 440 can adjust the actual route or provide a new route in the alert 444 for each vehicle 116. The alert information 444 may be communicated through a network 216 to each vehicle 116.

Route and Alert Data Structures

Figure 6:
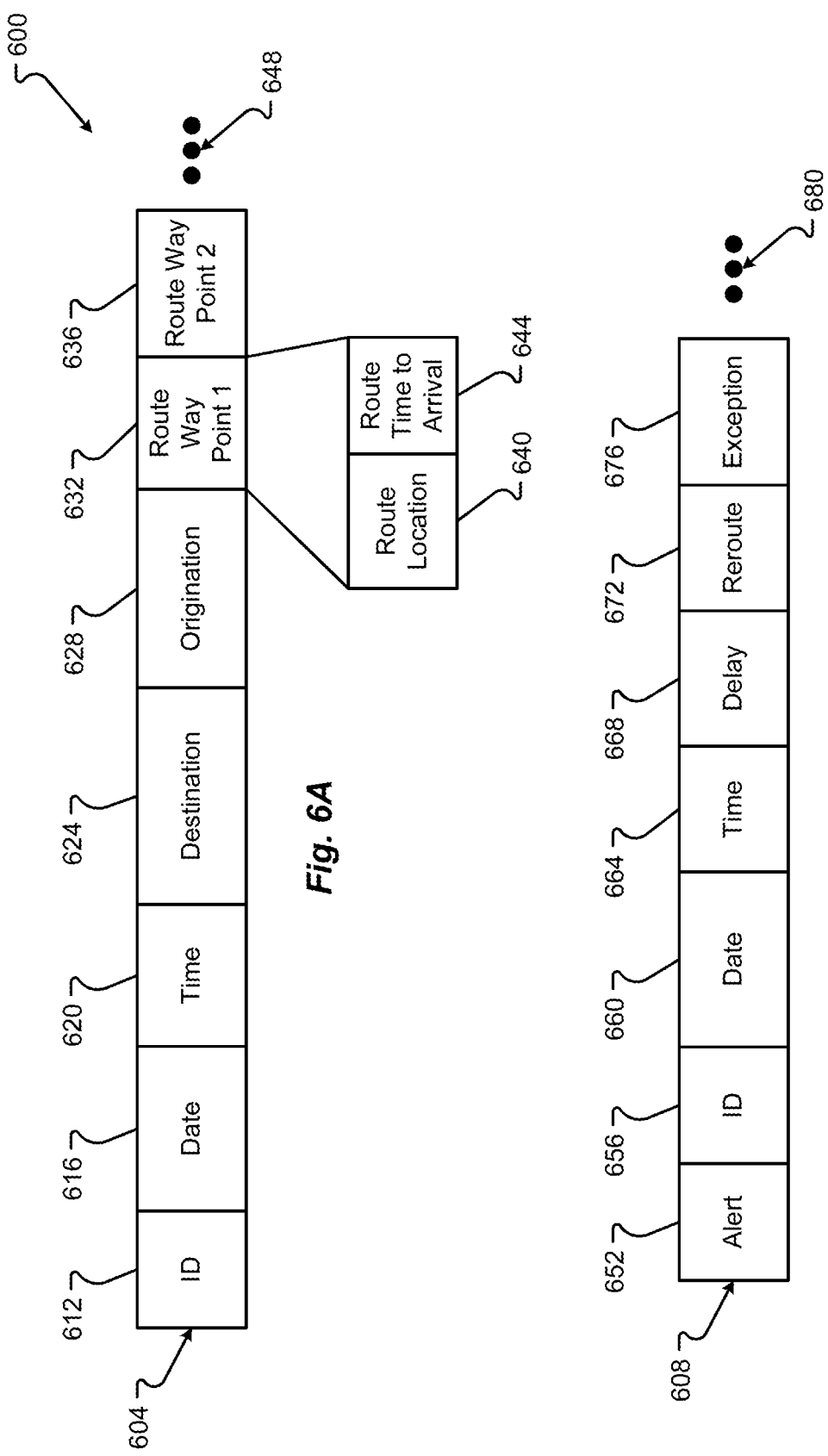
FIG. 6A is a block diagram of an embodiment of a data structure associated with a route to be traveled by an emergency vehicle.
FIG. 6B is a block diagram of an embodiment of a data structure associated with an alert associated with and warning other vehicles about a route to be traveled by an emergency vehicle.

An embodiment of a route information data structure 600 may be as shown in FIG. 6A. The data structure 600 may include one or more different data records 604 for each different route 132 used within the system. The data records 600 may include one or more fields but may have more or fewer fields than those shown in FIG. 6, as represented by ellipses 648. The data record 604 can include one or more fields for an identifier 612, a date 616, a time 620, a destination 624, an origination point 628, and/or one or more route waypoints 632. Each route waypoint 632, 636 may include one or more of, but is not limited to, a route location 640 and/or a time to arrival 644 at the location 640.

The identifier 612 can be any type of identifier that can uniquely identify this emergency route 132 from other routes created before or after the route 132. The identifier 612 can be a globally unique identifier (GUID), an alpha-numeric identifier, or some other identifier.

The date and time 616 and 620 can provide the date and time the route 132 was created for the emergency vehicle 120. The date 616 can be a day, month, and year, and the time 620 can be an hour, minute, second. The date and time information 616, 620 can be stored as a single time entry or separated as shown in record 604 as a date field 616 and time field 620.

The destination point 624 may refer to the point 124 to which the emergency vehicle 120 needs to proceed. This destination information 624 can include GPS coordinates, a latitude-longitude, street address, or some other indication of a destination. Further, the origination information 628 may have similar types of data such as GPS coordinates, an address, or latitude and longitude information. The origination information 624 may be the current location of the vehicle 128 or a location of the vehicle along the route 132. Thus, the origination 628 can provide the starting point for the vehicle's routes 132.

Route waypoints 632, 636 may be positions along the route 132. Each route waypoint may include a location 640 which, like the destination and origination information 624, 628, may be GPS coordinates, an address, latitude and longitude, or another indication of location. The route location 640 may be paired with a time to arrival information 644. Time to arrival information 644 may be the predicted time upon which the emergency vehicle 120 may arrive at the route waypoint location 640.

These two pieces of information 640, 644 for each waypoint 632, 636 allow for the vehicles 116 to determine when and how to reroute around an emergency vehicle 120. For example, based on the waypoints 632, 636, vehicle 116a can chose to take route 138 rather than 134 as the vehicle 116a may reach the point on route 134 at approximately the same time as the time of arrival 644 for the waypoint at that location 644 for the emergency vehicle 120.

An embodiment of another data structure or data record 608 having fields for the alert 444 may be as shown in FIG. 6B. The data record 608 may include fields for an alert indicator 652, an identifier 656, a date 660, a time 664, a delay indicator 668, a reroute indicator 672, and/or one or more exceptions 676. There may be more or fewer fields in the data record 608 as represented by ellipses 680.

The alert indicator 652 can be a bit or bits set within the message 608 that indicate, to the vehicle 116, that there is alert message 444 and may indicate the severity or amount of attention to pay to the alert 444. For example, rerouting around an emergency vehicle 120 may be urgent, and the alert 652 may indicate the alert 444 as being urgent that must be addressed immediately by the vehicle 116.

The identifier 656 can be any type of identifier that may identify this alert 608 from other alerts, whether those other alerts come before or after the current alert 608. Thus, the identifier 656 can be a GUID, an alphanumeric identifier, or some other type of identifier. The date and time 660, 664 may be formatted similar to the date and time 616, 620. However, the date and time 660, 664 may indicate the date and time of when the alert 608 was created. In this way, the alert 608 may have a later date and/or time stamp than the route information 604. This date and time 660, 664 can also indicate when the vehicle 116 needs to respond to the alert 608.

A delay indicator 668 may be an indication by the map server 220 to have the vehicle 116 delay their route. For example, the map server 220 may indicate that vehicle 116b should delay some time indicated by clock 142 based on the delay indicator 668 being sent to the vehicle 116. This delay indicator 668 can also include the amount of delay, when the delay should occur, and other information that allows the vehicle 116 to respond by delaying the vehicle's route for some period of time until the emergency vehicle 120 passes.

The reroute indicator 672 may be an indication or information of how to reroute around an emergency vehicle 120. For example, the map server 220 may send reroute information 672 to indicate vehicle 116a should use route 138 rather than route 134. In this way, the map server 220 can indicate, to a vehicle 116, to change the vehicle's route and/or how the vehicle 116 should travel rather than delaying the route.

One or more exceptions 676 may be some indication of which vehicle should respond. If the message 608 is broadcast to numerous vehicles, some vehicles 676 may be exempt from responding to the emergency alert 608. Thus, the exemption field 676 may include any information, such as required location or proximity to the route 132, to determine whether to respond to the alert message 608. The exceptions allow the appropriate vehicles 116 to autonomously determine if they should be rerouted.

User Interface

Figure 7:
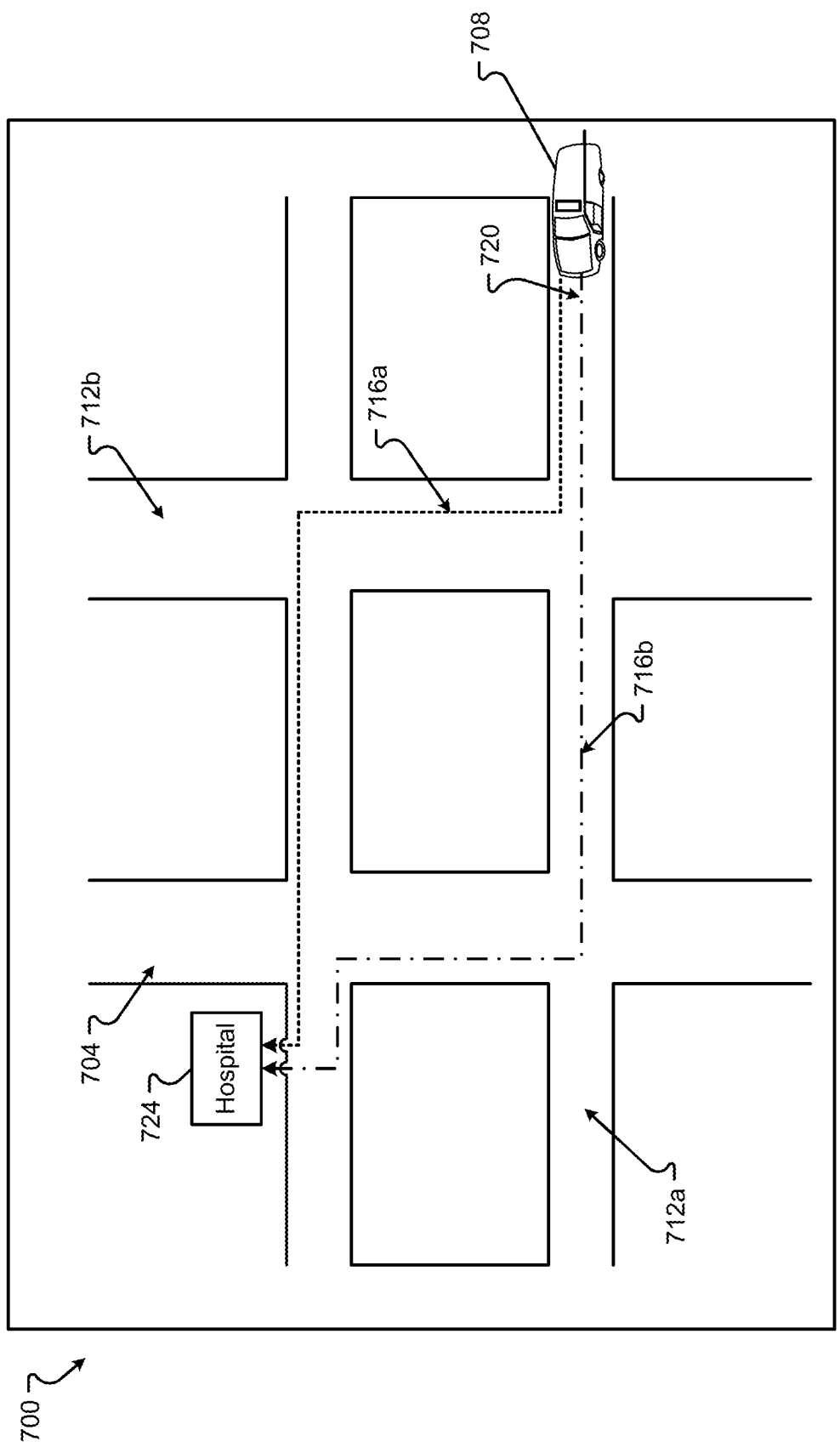
FIG. 7 is a representation of a user interface, displayed on a computer system, of a cityscape or streetscape in which an emergency vehicle may travel.

An embodiment of the user interface 700 for selecting routes in the PSAP 208 and/or showing routes in a vehicle 116, 120, may be as shown in FIG. 7. The user interface 700 can include a map 704 with streets and blocks that appear similar to the actual environment 100, as shown in FIG. 1. The map 704 may include one or more streets 712A, 712B. Upon these streets 712 may be projected the current location 720 of the emergency vehicle 120 indicated by icon 708 on the map 704. The icon 708 may be at the origination point 720 and the destination point 724 may also be indicated or shown by the hospital icon 724. Upon the map 704, one or more routes 716a, 716b may be projected as different colored lines, dashed lines, etc.

The routes 716a, 716b may be selected by a user interface device (e.g., a mouse) that can maneuver a cursor onto a route 716 and may click on the route 716 to choose the preferred route 716. For example, a user may use a mouse to select route two 716b to navigate the emergency vehicle 708 from point 720 to point 724. The selection of this route 716 may be received by the route selector 424 and used to create the route information as described previously.

Methods for Managing Traffic Around Emergency Vehicles

Figure 8:
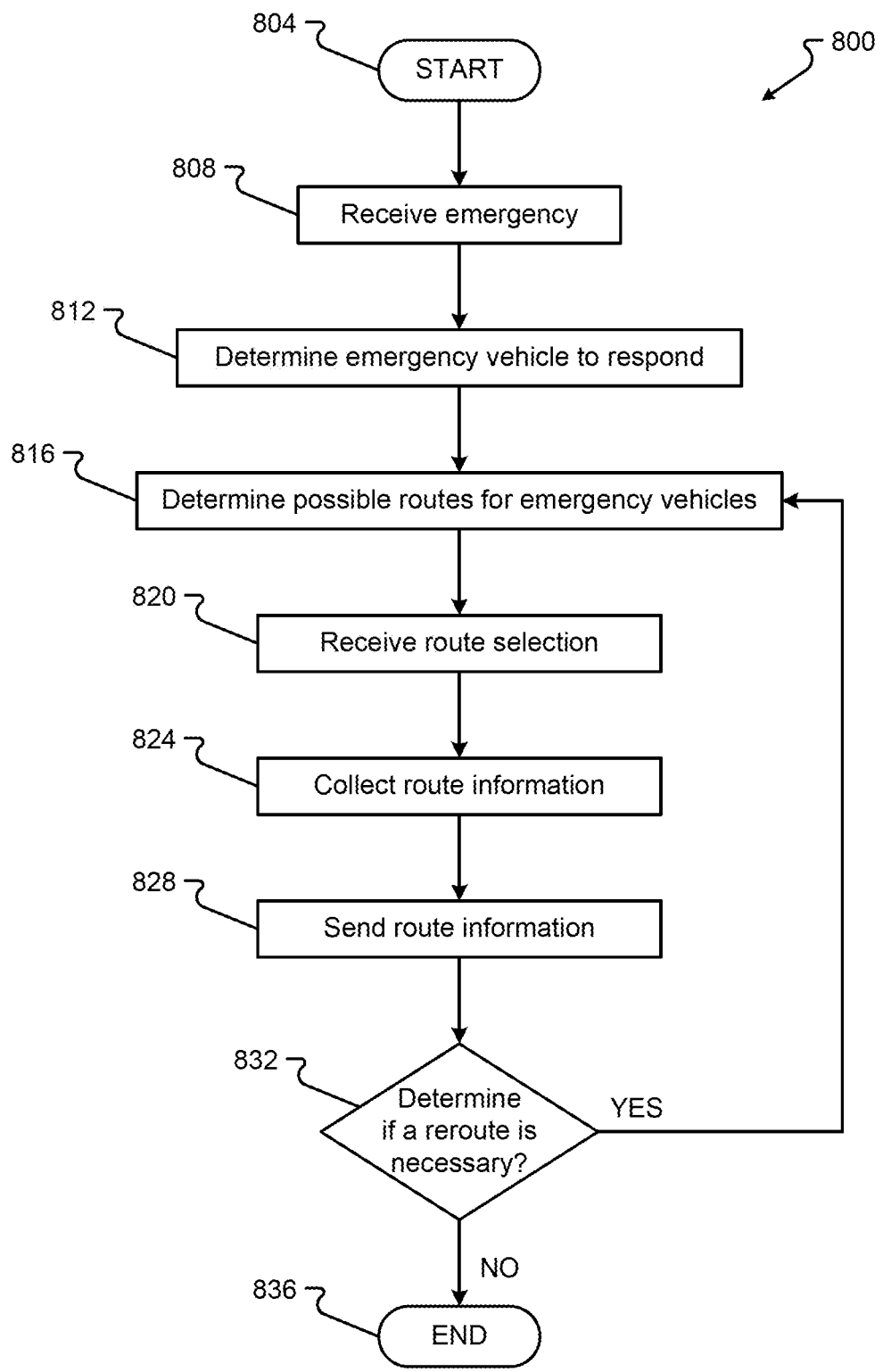
FIG. 8 is a process or flow diagram of an embodiment of a method, performed by a PSAP or similar system, for managing traffic associated with or interfering with the travel of an emergency vehicle.

An embodiment of a method 800 for rerouting a vehicle 116 around or near emergency vehicles 120 may be as shown in FIG. 8. The method 800 may be performed by the PSAP 208. A general order for the steps of the method 800 is shown in FIG. 8. Generally, the method 800 starts with a start operation 804 and ends with an end operation 836. The method 800 can include more or fewer steps or can arrange the order of the steps differently than those shown in FIG. 8. The method 800 can be executed as a set of computer-executable instructions executed by a computer system and encoded or stored on a computer readable medium. Hereinafter, the method 800 shall be explained with reference to the systems, components, modules, software, data structures, user interfaces, etc. described in conjunction with FIGS. 1-7.

The PSAP 208 can receive an emergency event 204, in step 808. The emergency event 204 can be any type of communication received by a citizen or an emergency vehicle 120 requiring emergency assistance or a route to a destination 124. Emergency event 204 can include information, such as a destination location 124 and the origination point 128 for the emergency vehicle 120. The emergency event information may be passed from the emergency receiver 416, that receives the event in the PSAP 208, to a route creator 420 within the PSAP 208.

The route creator 420 may determine which emergency vehicle 120 may respond to the emergency event, in step 812. Here the typical PSAP 208 processes may be executed to determine a vehicle 120 either by requesting the vehicle 120 to respond or by determining the vehicle 120 that is closest to the incident or origination 128. Based on one or more factors, the PSAP 208 can determine which vehicle 120 to respond.

The information about which vehicle 120 is responding is then used by the route creator 420 to determine possible routes 132a, 132b, in step 816. For example, the route creator 420 can create two or more possible routes 716a, 716b, which may then be presented in a user interface 700. These different routes 716a, 716b may then be selectable by a user through the route selector 424.

In step 820, the route selector 424 may receive input from the user interface 700 about which route 716 is selected and reserved for the emergency vehicle 120. For example, a user may use a user interface device, such as a mouse, to move a cursor over one of the routes 716a, 716b and use that device to select that route 716a, 716b. This information is then provided to the route selector 424. The route selector 424 may provide the indication of which route 716a, 716b is selected back to the route creator 420.

The route creator 420 may then collect route information, such as the origination point 128, the destination point 124 and one or more waypoints which describe the route 132, in step 824. Additionally or alternatively, the route creator 420 may also collect other information from the PSAP 208 user. For example, it may be possible to request an amount of clearing for the route 716. If a route has a benchmark or current traffic volume (e.g., 250 cars per mile), the PSAP 208 operator may request or specify that 50% of that traffic be cleared from the route 716. Thus, not all need be rerouted. Only enough vehicles need to be rerouted to ensure the fast and safe passage of the emergency vehicle 120. Traffic modeling software may be used to determine the needed clearing. Thus, the PSAP 208 may include enough data about the environment 100 to determine how much traffic volume allows for fast passage of the emergency vehicle 120. The route information may be composed in a data packet and then provided to the route communicator 428.

The route communicator can send the route 212, with the information provided from the route creator 420, in step 828. The route information 212 can include the information as described in conjunction with data record 604 shown in FIG. 6A or any other information described herein. The route 212 may be sent through the network 216 to the vehicle 116, map server 220, traffic control system 224 and/or the emergency vehicle 120.

In step 832, the emergency receiver 416 and or route creator 420 may determine if a reroute is necessary. A reroute is necessary if something occurs on the first selected route 716 that requires the emergency vehicle 120 to take a different route to the destination 124. Thus, the route 132 can be dynamically changed throughout the travel of the emergency vehicle 120 to the destination 124. If a reroute is required, the process 800 proceeds "YES" back to step 816. However, if no reroute is required, the process 800 proceeds "NO" to end operations 836.

Figure 9:
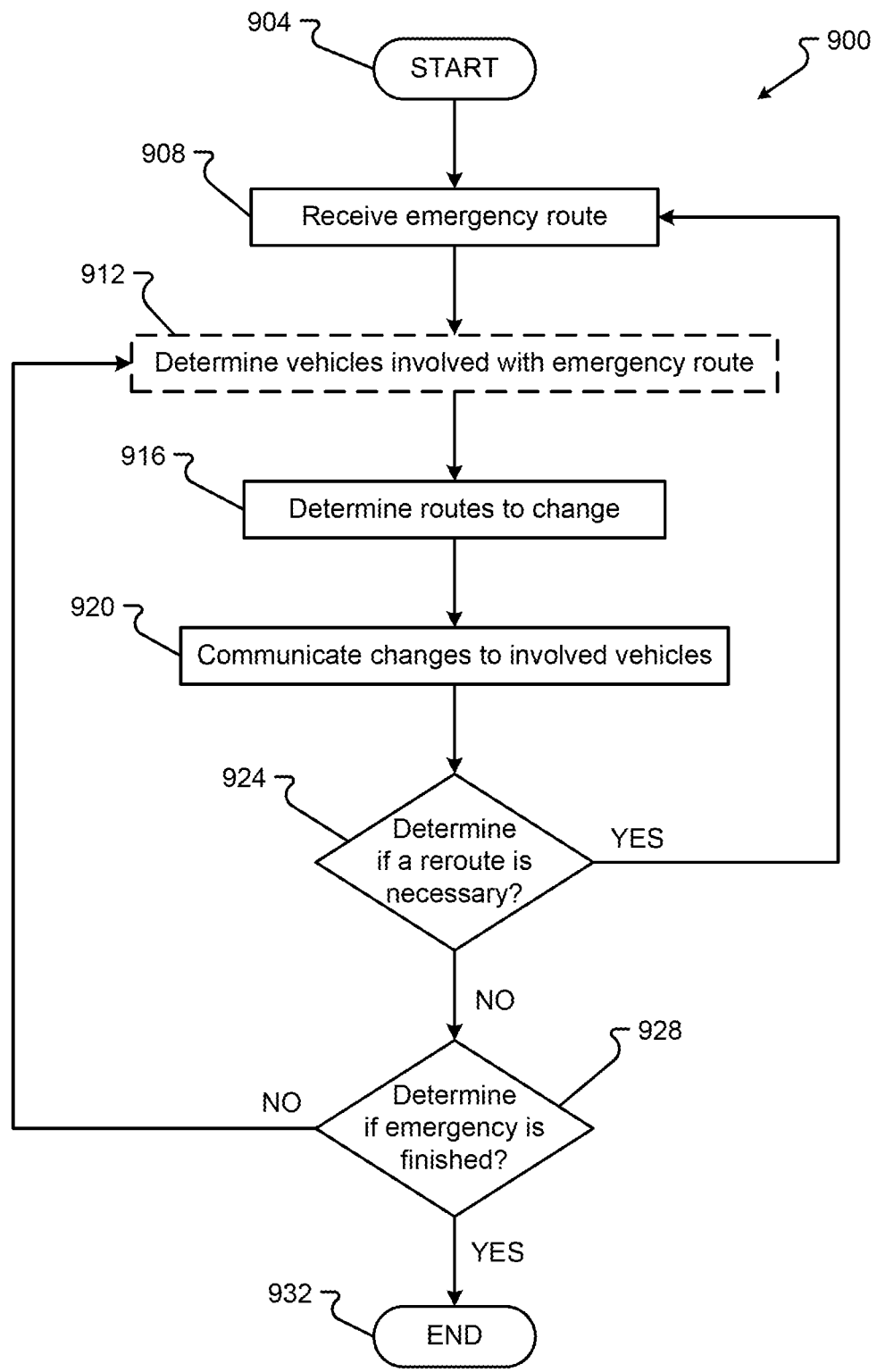
FIG. 9 is a process or flow diagram of an embodiment of a method, performed by a map server or similar system, for managing traffic associated with or interfering with the travel of an emergency vehicle.

An embodiment of a method 900 for changing the routes of one or more vehicles 116 based on a received route 212 of an emergency vehicle 120 may be as shown in FIG. 9. The method 900 may be as executed by the map server 220. A general order for the steps of the method 900 is shown in FIG. 9. Generally, the method 900 starts with a start operation 904 and ends with an end operation 932. The method 900 can include more or fewer steps or can arrange the order of the steps differently than those shown in FIG. 9. The method 900 can be executed as a set of computer-executable instructions executed by a computer system and encoded or stored on a computer readable medium. Hereinafter, the method 900 shall be explained with reference to the systems, components, modules, software, data structures, user interfaces, etc. described in conjunction with FIGS. 1-7.

The map server 220 may receive an emergency route 212 from a PSAP 208, in step 908. Thus, the route receiver 432 can receive the information provided by the PSAP 208 through the route data 212. The information received may be similar to that shown in record 604, shown in FIG. 6A, and may specify a route to be reserved by the PSAP 208, an amount of traffic clearing required, and/or other information. The route receiver 432 may read, interpret, and/or provide this route information to the vehicle filter 436, the route adjustment/communicator 440, or other components.

Optionally, the map server 220 may determine which vehicles are involved or may impede the route 716 of the emergency vehicle 120, in step 912. The vehicle filter 436 can determine the location of one or more vehicles 116 associated with the map server 220 within the environment 100 that may cross or be on the route 132 of the emergency vehicle 120. The information about which vehicles may be impacted by the route 132 may be obtained by polling the vehicles 116 within a geographic area 100 or may be determined from information already received from those vehicles 116. Based on their location and travel routes, the vehicle filter 436 can determine which vehicles 116 may be affected by the route 132.

The vehicle filter 436 can provide the information back to the route adjustment communicator 440 to determine how to change any routes within the environment 100. Thus, the determination of how to change the routes of the vehicles 116 may be optionally done by the map server 220 rather than the vehicle 116. In determining the route changes, in step 916, the route adjustment/communicator 440 can determine the original routes 134 of one or more vehicles 116 and determine if the vehicle 116 should be delayed or rerouted based upon waypoints 640 and the estimated time or arrival 644 of the emergency vehicle 120 along certain points within the route 132. The route impact information may then be used to determine the best change to the routes for each of the vehicles 116. The changes may be composed in an alert 444, which may have data as shown in record 608, shown in FIG. 6B. The route adjustment/communicator 440 can then communicate the alert 444 to one or more vehicles 116, in step 920. Thus, the alert 444 may be sent through the network 216 to one or more vehicles 116. In some configurations, the vehicle 116 may then adjust its route as described in conjunction with FIG. 8.

Upon sending the alert 444, the map server 220 can then periodically or thereinafter determine if a reroute is necessary, in step 924. A reroute may be required based on some change to travel of the emergency vehicle 120 and indicated by a new route 212 sent to the map server 220. If a reroute is necessary, the method 900 proceeds "YES" back to step 908. However if a route is not necessary, the method 900 proceeds "NO" to step 928.

In step 928, the map server 220 may determine if the emergency is finished. The emergency is finished if the emergency vehicle 120 has reached its destination point 124. The map server 220 may receive indication of the termination of the emergency from the PSAP 208 or may determine the termination has occurred based on the waypoints 632, 636 within the route information 604. If the emergency has not finished, the method 900 may proceed "NO" back to step 912 where the map server 220 can optionally determine if there are more vehicles 116 involved or affected by the route 132 of the emergency vehicle 120. If the emergency has concluded, the method 900 may proceed "YES" to end operation 932.

The map server 220 may optionally, periodically, or based on a portion of the route 132 determine which vehicles 116 are affected by the route 132 of the emergency vehicle 120. Then, the map server 220 need not make a complicated determination that numerous vehicles are affected by the route 132 and create numerous reroute instructions for the entire route 132. Rather, the map server 220 may break that route 132 into portions to reroute vehicles 116 as needed as the emergency vehicle 120 approaches those vehicles.

Figure 10:
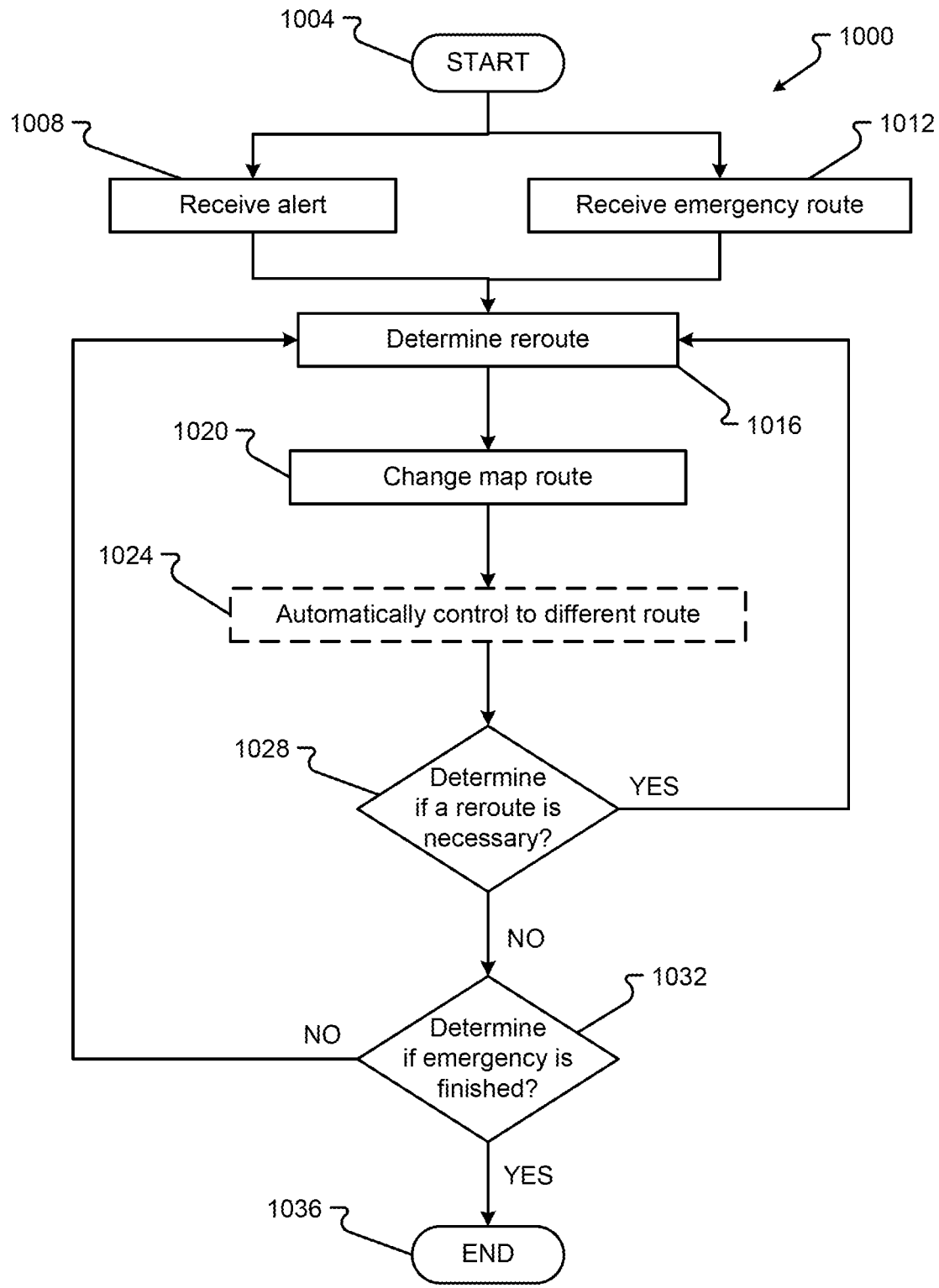
FIG. 10 is a process or flow diagram of an embodiment of a method, performed by a vehicle, for managing the vehicle's travel that is associated with or interfering with the travel of an emergency vehicle.

An embodiment of a method 1000 for rerouting a vehicle 116 in an environment 100 based on the route 132 of an emergency vehicle 120 may be as shown in FIG. 10. Here, the method 1000 may be as conducted by a vehicle 116. A general order for the steps of the method 1000 is shown in FIG. 10. Generally, the method 1000 starts with a start operation 1004 and ends with an end operation 1036. The method 1000 can include more or fewer steps or can arrange the order of the steps differently than those shown in FIG. 10. The method 1000 can be executed as a set of computer-executable instructions executed by a computer system and encoded or stored on a computer readable medium. Hereinafter, the method 1000 shall be explained with reference to the systems, components, modules, software, data structures, user interfaces, etc. described in conjunction with FIGS. 1-7.

In step 1008, the vehicle may receive an alert 444. The alert receiver 404 can receive the alert 444 generated by the map server 220 with information as described in conjunction with alert record 608, shown in FIG. 6B. This alert information 608 may then be communicated to the map guidance software 408 to change the route of the vehicle 116. In other configurations, the vehicle 116 may receive the emergency route information in record 604, communicated from the PSAP 208, as a route 212 through a network 216, in step 1012. Thus, in this alternative situation, the alert receiver 404 receives the same information as the map server 220 may receive and can conduct or change the vehicle's route based on that information rather than receiving the alert 444.

The map guidance software 408 may then determine a reroute, in step 1016. Here, the map guidance software 408 may use the data either in record 604 or 608 to determine whether a reroute 138 or a delay 142 is required for the vehicle 116. Regardless of what the determination of how to maneuver the vehicle 116 away from the emergency vehicle 120, information is provided from the map guidance software 408 to change the map route, in step 1020. This change in the map route may be as shown in the user interface within the vehicle 116 or may be automatically conducted by the automobile controller 504.

Optionally, the automobile controller 504 can receive the reroute information from the traffic controller 512 and automatically control the vehicle 116 to a different route, in step 1024. Thus, the automobile controller 504 can control one or more of the mechanical systems of the vehicle 116 to move the car automatically away from the emergency vehicle 120. If no automatic control is completed by the automobile controller 504, the user may be prompted to follow the different route and may be provided information that an emergency vehicle 120 will be using the route currently being used by the vehicle 116. In that way, the user of the vehicle 116 may be motivated to follow the reroute rather than continue on the same route and avoid the problems with intersecting or traveling within physical proximity of the emergency vehicle 120.

In step 1028, the map guidance software 408 can determine if a further reroute is necessary. The alert receiver 404 may receive an updated route 212 or another alert 444 based on some change to the emergency vehicle 120. If such information is received, the map guidance software 408 may determine a reroute is necessary and the method 1000 will proceed "YES" back to step 1016. However, as long as no other information is received, the method 1000 proceeds "NO" to step 1032. In step 1032, the map guidance software 408 may determine if the emergency is finished. This determination may be made by information within the alert 444 or the route information 212. Thus, if there is an indication that the emergency vehicle 120 is no longer within the route of the vehicle 116 or has reached its destination 124, the method may proceed "YES" to end operation 1036. However, if there is a determination that the emergency event has not finished, the method may proceed "NO" to step 1016 to determine if a reroute or route is necessary.

FIG. 11 illustrates a block diagram of a computing environment 1100 that may function as the servers, user computers, or other systems provided and described above. The environment 1100 includes one or more user computers 1105, 1110, and 1115. The user computers 1105, 1110, and 1115 may be general purpose personal computers (including, merely by way of example, personal computers, and/or laptop computers running various versions of Microsoft Corp.'s Windows' and/or Apple Corp.'s Macintosh® operating systems) and/or workstation computers running any of a variety of commercially-available UNIX' or UNIX-like operating systems. These user computers 1105, 1110, 1115 may also have any of a variety of applications, including for example, database client and/or server applications, and web browser applications. Alternatively, the user computers 1105, 1110, and 1115 may be any other electronic device, such as a thin-client computer, Internet-enabled mobile telephone, and/or personal digital assistant, capable of communicating via a network 1120 and/or displaying and navigating web pages or other types of electronic documents. Although the exemplary computer environment 1100 is shown with three user computers, any number of user computers may be supported.

Environment 1100 further includes a network 1120. The network 1120 may can be any type of network familiar to those skilled in the art that can support data communications using any of a variety of commercially-available protocols, including without limitation SIP, TCP/IP, SNA, IPX, AppleTalk, and the like. Merely by way of example, the network 1120 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth® protocol known in the art, and/or any other wireless protocol); and/or any combination of these and/or other networks.

The system may also include one or more server 1125, 1130. In this example, server 1125 is shown as a web server and server 1130 is shown as an application server. The web server 1125, which may be used to process requests for web pages or other electronic documents from user computers 1105, 1110, and 1115. The web server 1125 can be running an operating system including any of those discussed above, as well as any commercially-available server operating systems. The web server 1125 can also run a variety of server applications, including SIP servers, HTTP servers, FTP servers, CGI servers, database servers, Java servers, and the like. In some instances, the web server 1125 may publish operations available operations as one or more web services.

The environment 1100 may also include one or more file and or/application servers 1130, which can, in addition to an operating system, include one or more applications accessible by a client running on one or more of the user computers 1105, 1110, 1115. The server(s) 1130 and/or 1125 may be one or more general purpose computers capable of executing programs or scripts in response to the user computers 1105, 1110 and 1115. As one example, the server 1130, 1125 may execute one or more web applications. The web application may be implemented as one or more scripts or programs written in any programming language, such as Java™, C, C# C++ and/or a combination of any programming/scripting languages. The application server(s) 1130 may also include database servers, including without limitation those commercially available from Oracle, Microsoft, Sybase™, IBM™ and the like, which can process requests from database clients running on a user computer 1105.

The web pages created by the server 1125 and/or 1130 may be forwarded to a user computer 1105 via a web (file) server 1125, 1130. Similarly, the web server 1125 may be able to receive web page requests, web services invocations, and/or input data from a user computer 1105 and can forward the web page requests and/or input data to the web (application) server 1130. In further embodiments, the web server 1130 may function as a file server. Although for ease of description, FIG. 11 illustrates a separate web server 1125 and file/application server 1130, those skilled in the art will recognize that the functions described with respect to servers 1125, 1130 may be performed by a single server and/or a plurality of specialized servers, depending on implementation-specific needs and parameters. The computer systems 1105, 1110, and 1115, web (file) server 1125 and/or web (application) server 1130 may function as the system, devices, or components described in FIGS. 1-5.

The environment 1100 may also include a database 1135. The database 1135 may reside in a variety of locations. By way of example, database 1135 may reside on a storage medium local to (and/or resident in) one or more of the computers 1105, 1110, 1115, 1125, 1130. Alternatively, it may be remote from any or all of the computers 1105, 1110, 1115, 1125, 1130, and in communication (e.g., via the network 1120) with one or more of these. The database 1135 may reside in a storage-area network ("SAN") familiar to those skilled in the art. Similarly, any necessary files for performing the functions attributed to the computers 1105, 1110, 1115, 1125, 1130 may be stored locally on the respective computer and/or remotely, as appropriate. The database 1135 may be a relational database, such as Oracle 11i®, that is adapted to store, update, and retrieve data in response to SQL-formatted commands.

FIG. 12 illustrates one embodiment of a computer system 1200 upon which the servers, user computers, or other systems or components described above may be deployed or executed. The computer system 1200 is shown comprising hardware elements that may be electrically coupled via a bus 1255. The hardware elements may include one or more central processing units (CPUs) 1215; one or more input devices 1210 (e.g., a mouse, a keyboard, etc.); and one or more output devices 1215 (e.g., a display device, a printer, etc.). The computer system 1200 may also include one or more storage devices 1220. By way of example, storage device(s) 1220 may be disk drives, optical storage devices, solid-state storage devices such as a random access memory ("RAM") and/or a read-only memory ("ROM"), which can be programmable, flash-updateable and/or the like.

The computer system 1200 may additionally include a computer-readable storage media reader 1225; a communications system 1230 (e.g., a modem, a network card (wireless or wired), an infra-red communication device, etc.); and working memory 1240, which may include RAM and ROM devices as described above. The computer system 1200 may also include a processing acceleration unit 1235, which can include a DSP, a special-purpose processor, and/or the like.

The computer-readable storage media reader 1225 can further be connected to a computer-readable storage medium, together (and, optionally, in combination with storage device(s) 1220) comprehensively representing remote, local, fixed, and/or removable storage devices plus storage media for temporarily and/or more permanently containing computer-readable information. The communications system 1230 may permit data to be exchanged with a network and/or any other computer described above with respect to the computer environment 1100. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1200 may also comprise software elements, shown as being currently located within a working memory 1240, including an operating system 1245 and/or other code 1250. It should be appreciated that alternate embodiments of a computer system 1200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1205 as described herein may include, but are not limited to, at least one of Qualcomm® Snapdragon® 800 and 801, Qualcomm® Snapdragon® 611 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to routing of vehicles within an environment. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others. The present disclosure can provide a number of advantages depending on the particular configuration. For example, the system allows for the automated adjustment of routes intersecting the travel route of an emergency vehicle. The rerouting ensures faster response times for the emergency vehicles and prevents possible accidents with the emergency vehicles. Further, the systems and methods expand the type of information that may be provided in map and guidance software. Now, real time emergencies are identified for drivers. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for rerouting vehicles affected by travel of an emergency vehicle, the method comprising:
   receiving, by a processor of a public safety access point, data associated with an emergency event, wherein the data associated with the emergency event comprises a destination location;
   determining, by the processor, an emergency vehicle to respond to the emergency event, wherein the emergency vehicle is associated with an origination location;
   determining, by the processor, a first route of the emergency vehicle between the destination location and the origination location; and
   communicating, by the processor, information associated with the first route to a map server, wherein a percentage of the one or more non-emergency vehicles are rerouted to avoid the first route based on the information, and wherein the first route is reserved for the emergency vehicle, wherein the percentage of the one or more non-emergency vehicles is determined based on a request from a public safety access point operator.

2. The method of claim 1, wherein the information associated with the route comprises information associated with the destination location, the origination location, and one or more waypoints.

3. The method of claim 2, wherein a first waypoint of the one or more waypoints is a location between the destination location and the origination location, wherein the emergency vehicle is instructed to stop at the location prior to reaching the destination location.

4. The method of claim 1, further comprising determining, by the processor, a second route between the destination location and the origination location.

5. The method of claim 4, further comprising receiving, by the processor, a selection of a selected route from the emergency vehicle, wherein the selected route is one of the first and second routes.

6. The method of claim 1, wherein the information associated with the first route comprises data about an environment to determine how much traffic volume allows for fast passage of the emergency vehicle.

7. The method of claim 1, wherein the percentage of the one or more non-emergency vehicles is associated with a volume of traffic to be rerouted.

8. The method of claim 1, wherein the percentage of the one or more non-emergency vehicles is associated with a current traffic volume for the first route.

9. A public safety access point comprising:
a processor; and
a communication system in communication with the processor;
wherein the processor:
receives data associated with an emergency event, wherein the data comprises a destination location;
determines an emergency vehicle to respond to the emergency event, wherein the emergency vehicle is associated with an origination location;
determines a first route for the emergency vehicle between the destination location and the origination location; and
communicates information associated with the first route to a map server, wherein a percentage of the one or more non-emergency vehicles are rerouted to avoid the first route based on the information, and wherein the first route is reserved for the emergency vehicle, wherein the percentage of the one or more non-emergency vehicles is determined based on a request from a public safety access point operator.

10. The public safety access point of claim 9, wherein the information associated with the route comprises information associated with the destination location, the origination location, and one or more waypoints.

11. The public safety access point of claim 10, wherein a first waypoint of the one or more waypoints is a location between the destination location and the origination location, wherein the emergency vehicle is instructed to stop at the location prior to reaching the destination location.

12. The public safety access point of claim 9, wherein the processor determines a second route between the destination location and the origination location.

13. The vehicle navigation system of claim 12, wherein the processor receives a selection of a selected route from the emergency vehicle, wherein the selected route is one of the first and second routes.

14. The public safety access point of claim 9, wherein the information associated with the first route comprises data about an environment to determine how much traffic volume allows for fast passage of the emergency vehicle.

15. A method for rerouting vehicles affected by travel of an emergency vehicle, the method comprising:
receiving, by a processor of a map server, information associated with a first route of travel for an emergency vehicle associated with an emergency event from a public safety access point (PSAP), wherein the information associated with the first route comprises a destination location and a percentage of one or more non-emergency vehicles to reroute to avoid the first route, wherein the percentage of the one or more non-emergency vehicles is determined based on a request from a public safety access point operator;
determining, by the processor, a plurality of non-emergency vehicles involved with the first route, wherein the plurality of non-emergency vehicles is associated with the percentage of one or more non-emergency vehicles;
determining, by the processor, a change to a route of a first non-emergency vehicle of the plurality of non-emergency vehicles, wherein the change to the route of the first non-emergency vehicle causes the first non-emergency vehicle to avoid the first route; and
communicating, by the processor, the change to the route of the first non-emergency vehicle to a communication system of the first non-emergency vehicle.

16. The method of claim 15, wherein the first route of the emergency vehicle comprises the destination location, a current location of the emergency vehicle, and a waypoint.

17. The method of claim 15, wherein the processor receives at least some information about the first route from a traffic control system.

18. The method of claim 15, the method further comprising:
determining, by the processor of the map server, that a second non-emergency vehicle of the plurality of non-emergency vehicles is involved with the first route;
determining, by the processor, a change to a route of the second non-emergency vehicle, wherein the change to the route of the second non-emergency vehicle causes the second non-emergency vehicle to avoid the first route; and
communicating, by the processor of the map server, the change to the route of the second non-emergency vehicle to the second non-emergency vehicle.

19. The method of claim 18, further comprising sending, by the processor of the map server, an alert to at least the first and second non-emergency vehicles.

* * * * *